United States Patent
Smyth et al.

(10) Patent No.: US 8,435,579 B2
(45) Date of Patent: May 7, 2013

(54) INFUSED ROASTED SEEDS AND METHODS OF MAKING THEREOF

(75) Inventors: Douglas A. Smyth, Belvedire, NJ (US);
Heather Michelle Johnson, Branchburg, NJ (US); Emily Jane Rudolph, Morristown, NJ (US); Jan Karwowski, Franklin Lakes, NJ (US); Chen Y. Wang, Morris Plains, NJ (US); Jaime C. Ho, Sagamore Hills, OH (US)

(73) Assignee: Kraft Foods Group Brands LLC, Northfield, IL (US)

( * ) Notice: Subject to any disclaimer, the term of this patent is extended or adjusted under 35 U.S.C. 154(b) by 249 days.

(21) Appl. No.: 12/815,223

(22) Filed: Jun. 14, 2010

(65) Prior Publication Data
US 2010/0310739 A1 Dec. 9, 2010

Related U.S. Application Data

(63) Continuation-in-part of application No. 11/456,100, filed on Jul. 7, 2006.

(60) Provisional application No. 61/187,136, filed on Jun. 15, 2009.

(51) Int. Cl.
*A23G 3/00* (2006.01)
(52) U.S. Cl.
USPC .............................. 426/93; 426/629; 426/632
(58) Field of Classification Search .................. 426/637, 426/93
See application file for complete search history.

(56) References Cited

U.S. PATENT DOCUMENTS

| | | | |
|---|---|---|---|
| 2,643,190 | A | 6/1953 | Hageman |
| 2,926,091 | A | 2/1960 | Riddle |
| 3,457,087 | A | 7/1969 | Renner et al. |
| 3,645,752 | A | 2/1972 | Baxley |
| 3,740,236 | A | 6/1973 | Baxley |
| 4,049,833 | A | 9/1977 | Gannis et al. |
| 4,085,230 | A | 4/1978 | Green |
| 4,167,585 | A | 9/1979 | Caridis et al. |
| 4,206,246 | A | 6/1980 | Mamahit |
| RE30,651 | E | 6/1981 | Green |
| 4,329,375 | A | 5/1982 | Holloway, Jr. et al. |

(Continued)

FOREIGN PATENT DOCUMENTS

| CA | 1096694 A1 | 3/1981 |
|---|---|---|
| CN | 101283763 A | 10/2008 |

(Continued)

OTHER PUBLICATIONS

PCT International Search Report and the Written Opinion of the International Searching Authority for International Application No. PCT/US2010/038592 dated Aug. 2, 2010, 16 pages.

(Continued)

*Primary Examiner* — Patricia George
(74) *Attorney, Agent, or Firm* — Fitch, Even, Tabin & Flannery LLP

(57) ABSTRACT

Roasted infused seeds and a process for preparing roasted infused seeds are described. In one aspect, the roasted infused seeds may have salt, flavors, nutrients, colors, and/or functional ingredients as well as mixtures of these components infused internally into the seed. By infusing such components into the seeds, the methods described herein provide roasted seeds with unique flavors, nutrients, colors, textures, densities, and/or other functionalities.

14 Claims, 32 Drawing Sheets

U.S. PATENT DOCUMENTS

| | | | |
|---|---|---|---|
| 4,363,263 A | 12/1982 | Williams | |
| 4,436,757 A | 3/1984 | Lange et al. | |
| 4,504,502 A | 3/1985 | Earle et al. | |
| 4,515,820 A | 5/1985 | Tang | |
| 4,522,833 A * | 6/1985 | Sharma | 426/93 |
| 4,595,596 A | 6/1986 | Fazzolare et al. | |
| 4,597,973 A | 7/1986 | Moore | |
| 4,663,175 A | 5/1987 | Werner et al. | |
| 4,769,248 A | 9/1988 | Wilkins et al. | |
| 4,834,063 A | 5/1989 | Hwang et al. | |
| 4,931,304 A | 6/1990 | Sharma | |
| 4,938,987 A | 7/1990 | Gannis et al. | |
| 5,002,802 A | 3/1991 | Gannis et al. | |
| 5,061,499 A | 10/1991 | Holloway, Jr. et al. | |
| 5,094,874 A | 3/1992 | Zook | |
| 5,164,217 A | 11/1992 | Wong et al. | |
| 5,194,278 A | 3/1993 | Strong | |
| 5,243,962 A | 9/1993 | Hwang | |
| 5,290,578 A | 3/1994 | Passey et al. | |
| 5,407,692 A | 4/1995 | Caridis et al. | |
| 5,433,961 A | 7/1995 | Lanner et al. | |
| 5,595,780 A | 1/1997 | Zook | |
| 5,718,936 A * | 2/1998 | Porter et al. | 426/289 |
| 5,939,119 A | 8/1999 | Cheng et al. | |
| 5,960,703 A | 10/1999 | Jara et al. | |
| 6,572,907 B1 | 6/2003 | Gorang et al. | |
| 7,078,067 B2 | 7/2006 | Latha et al. | |
| 2004/0191395 A1 | 9/2004 | Latha et al. | |
| 2005/0089613 A1 | 4/2005 | Nair | |
| 2008/0008803 A1 | 1/2008 | Cea et al. | |
| 2010/0255163 A1 | 10/2010 | Anand et al. | |

FOREIGN PATENT DOCUMENTS

| | | |
|---|---|---|
| DE | 25 05 644 A1 | 8/1976 |
| DE | 10 2004 043 972 A1 | 3/2006 |
| EP | 0 626 811 B1 | 12/1997 |
| JP | 63-192355 A | 8/1988 |
| WO | 91/10372 A1 | 7/1991 |
| WO | 93/16609 A1 | 9/1993 |
| WO | 2004/066751 A1 | 8/2004 |

OTHER PUBLICATIONS

Japanese Patent Office, Patent Abstracts of Japan for Publication No. JP 04020271 A, published Jan. 23, 1992, for "Preparation of Seasoned Peanut" (1 page).

Japanese Patent Office, Patent Abstracts of Japan for Publication No. JP 2001231478 A, published Aug. 28, 2001, for "Method for Producing Roasted Peanut" (1 page).

Japanese Patent Office, Patent Abstracts of Japan for Publication No. JP 2002209566 A, published Jul. 30, 2002, for "Apparatus for Roasting With Superheated Steam" (1 page).

FSTA Database Abstract, Accession No. 1989-09-Jz0131, A. L. Branch et al., "Effect of hot water immersion on sensory properties of non-refrigerated peanuts," Peanut Science, vol. 15, No. 1, pp. 18-21, 1988 (1 page).

FSTA Database Abstract, Accession No. 1991-12-Jz0176, R. Y. Y. Chiou and T. T. Tsai, "Characterization of peanut proteins during roasting as affected by initial moisture content," Journal of Agricultural & Food Chemistry, vol. 37, No. 5, pp. 1377-1381, 1989 (1 page).

FSTA Database Abstract, Accession No. 2002-Js2894, A. P. Adebiyi et al., "Effects of processing conditions and packaging material on the quality attributes of dry-roasted peanuts," Journal of the Science of Food & Agriculture, vol. 82, No. 13, pp. 1465-1471, 2002 (1 page).

The Grinning Planet, Nuts—Health Benefits of Eating Nuts, Buying Tips, Jan. 11, 2005, [online]. Retrieved from the Internet: <URL: http://www.grinningplanet.com/2005/01-11/nuts-health-benefits-article.htm> on Sep. 14, 2009 (7 pages).

The Nut Factory : Kitchen : Interesting Facts : Peanuts, Gene Cohen, Peanut Folklore, Feb. 17, 2005, [online]. Retrieved from the Internet: <URL: http://web.archive.org/web/20051028092742/http://www.thenutfactory.com/kitchen/facts/f...> on Jul. 20, 2010 (7 pages).

* cited by examiner

INFUSED ROASTED SEEDS AND METHODS OF MAKING THEREOF

CROSS REFERENCE TO RELATED APPLICATIONS

This application is a continuation-in-part of prior application Ser. No. 11/456,100, filed Jul. 7, 2006, which is hereby incorporated herein by reference in its entirety. This application claims benefit of Provisional Application No. 61/187,136, filed Jun. 15, 2009, which is hereby incorporated herein by reference in its entirety.

FIELD

This field relates to roasted seeds, and more particularly, to roasted seeds having infused components.

BACKGROUND

Edible seeds include a wide variety of nuts, kernels, legumes, beans, and the like. Common examples include nuts, peanuts, almonds, pistachios, cashews, hazelnuts, filberts, macadamia nuts, brazil nuts, pine nuts, pecans, walnuts, pine nuts, sunflower seeds, pumpkin seeds, cocoa seeds, grains, coffee beans, and the like. Such seeds are often used by snack food manufacturers, confectioners, ice cream manufacturers, cereal manufacturers, bakers, chefs, cooks, and so forth. Roasted seed products, such as roasted peanuts, almonds, cashews and the like, are a popular consumer snack product. Roasted seeds can also be a savory source of dietary protein and fiber. Roasted snack nuts or seeds generally refers to a category of edible nuts or seeds where raw seeds, such as those described above, are removed from a shell, possibly removing a seed coat, and then roasting the resulting kernel using forced air ovens, oil fryers, or other heating methods to develop a roasted nut flavor and appropriate crunchy texture.

In some instances, to make a crunchier roasted seed and/or a roasted seed with a lighter color, the raw seeds may be subjected to a pre-roast soaking in a pool of water to infuse moisture into the uncooked seed kernels. However, there are several shortcomings to soaking seeds in a large excess of water. Soaking tends to extract out soluble seed constituents such as sugar, minerals, and other seed components, which may account for a reduced flavor and/or color development during subsequent roasting. Over time, the buildup of such seed constituents in the soak water may also make it difficult to form a uniform finished product because the concentration of extracted constituents in the soak water may vary over time and render the final composition of the soaked seeds variable and difficult to produce consistent products. Moreover, the soak water containing dissolved seed constituents may present challenges for proper disposal and/or require complex clarification procedures to remove the dissolved components.

Snack nuts and seeds can also be enhanced with seasonings and/or flavors that are commonly topically applied to an outer surface of the roasted snack nuts. However, the topical additives, in some cases, generally do not remain adequately adhered to the seed surface and may fall off into the package forming crumbs at the bottom of the bag or make a mess in the consumer's hands upon eating. Various edible adhesives, such as maltodextrin, gelatin, viscous honey solutions and the like, have been attempted to better adhere such seasonings to the seed's surface, but such coatings can form an unnatural appearing nut or present a heavy flavor. When adding seasonings or flavors to roasted nuts and seeds, it is generally accepted that many complex flavors and seasonings need to be added post roast. For example, U.S. Pat. No. 4,931,304 to Sharma explains that the flavors must be added after roasting because, if added before roasting, they will tend to be lost and/or altered during the roasting process, which can result in inadequate, undesirable, and/or distorted flavors in the roasted seeds.

Seeds may also be seasoned by soaking in a pool of brine (aqueous salt solution) prior to roasting, which tends to infuse salt into the raw seeds. However, soaking raw seeds in a brine solution still runs into the shortcomings discussed above when soaking raw seeds in water. Seed constituents tend to be extracted out of the seed and the brine tends to accumulate these dissolved constituents.

Instead of soaking in a pool of water or brine, other processes attempt to apply water or a brine solution to the nuts, but tend to be limited in application. U.S. Pat. Nos. 4,597,973 to Moore and 5,718,936 to Porter are examples. However, neither patent addresses the problem of achieving maximum water and salt uptake in a system that does not soak the seeds in a pool of water. In Moore's process, for example, the raw nuts are subjected to a pretreatment with 265° F. to 290° F. heated air to cause the surface cells of the nuts to expand in order to render the nuts permeable to a brine solution. However, Moore's process then applies the brine solution to the nuts when still at the elevated temperatures, which may hinder water and/or salt uptake because the high nut temperatures may cause evaporation of water as it initially contacts the nuts. In Porter's process, a first coating zone applies a brine solution to provide a coating of salt on the nuts. However, Porter's first coating zone includes the simultaneous addition of the raw nuts and all the brine solution at the same time. That is, the amount of brine desired to be added to the nuts is applied all at once in bulk to the nuts. Thus, it is likely in Porter's process that there is localized pooling of the brine because the large initial application of brine solution can not be coated or infused rapidly enough into the nuts when all of the brine is added to the nuts at one time. There will likely be localized pooling of the brine in Porter's process, which will also likely result in the seed constituent extraction problems discussed above with soaking.

SUMMARY

Roasted infused seeds and a process for preparing roasted infused seeds are described. By one approach, the roasted infused seeds may have salt, flavors, nutrients, colors, and/or functional ingredients as well as mixtures of these components infused internally into the seed. In this approach, by infusing such flavor components internally, the methods described herein provide roasted seeds with unique flavors, nutrients, colors, textures, densities, and/or other functionalities that are substantially free of visibly detectable surface coatings or other applications.

In one aspect, a process for preparing roasted flavor infused seeds is provided by infusing pre-roast an aqueous flavor infusion solution. The process includes first preparing an aqueous flavor infusion solution by blending an amount of one or more flavor infusion components in water or a brine solution. Next, the aqueous flavor infusion solution is applied to raw seeds at a selected application rate so that both the water and the flavor infusion components (and salt if used) infuse internally into the raw seeds without immersing the raw seeds in a pool of the aqueous flavor infusion solution to form flavored infused raw seeds. In one approach, the seeds have an outer surface substantially free of visibly detectable flavor infusion components and/or salt. Then, the flavor infused raw seeds are roasted to produce the roasted flavor infused seeds having an amount of a flavor infused therein wherein the flavor is obtained from the flavor infusion solution.

In another aspect, a brine solution and/or a flavor infusion solution may be applied to the raw seeds using a continuous application rate of about 5 to about 10 grams solution/minute/kilogram raw seeds over a time period of about 3 to about 10 minutes to infuse the raw seeds. This application rate is selected so that the infusion is effective without substantially immersing the raw seeds in a pool of the solution or brine. Such application rate is also effective to produce infused raw seeds with substantially no visibly detectable surface coating of sodium chloride or flavor infusion components. In yet another aspect, the process includes conditioning the raw seeds at a temperature of about 100° F. or less and then applying the brine and/or the aqueous infusion solution at a temperature of about 70° F. to about 200° F. so that a temperature differential between the conditioned raw seeds and the solution is about 80° F. or less to effect the infusion.

FIGS. $29a$-$29f$ and $30a$-$30f$ are stereo microscopy and x-ray microanalysis of sodium salt infused almonds.

DETAILED DESCRIPTION OF THE PREFERRED EMBODIMENTS

Roasted infused seeds and a process for preparing roasted infused seeds are described. In one aspect, the roasted infused seeds may have salt, flavors, nutrients, colors, and/or functional ingredients as well as mixtures of these components infused internally into the seed. By infusing such components into the seeds, the methods described herein provide roasted seeds with unique flavors, nutrients, colors, textures, densities, and/or other functionalities that are substantially free of visibly detectable surface coatings or other applications. Thus, there is little to no loss of the infusion components during subsequent handling as found in the prior seasoned or salted snack nuts. In some approaches, the processes herein may also provide a snack seed or nut that generally does not make a mess for the consumer to handle or eat.

In another aspect, the roasted infused seeds are prepared using selected application rates, times, and methods of an aqueous infusion solution prior to roasting to efficiently achieve infusion into the raw seed without substantially immersing the raw seeds in a pool of the infusion solution. Thus, the process avoids the undesired soaking of seeds commonly found in the prior processes. In some aspects, the methods herein may also provide for a two-stage application of components. A first stage infuses components internally into the seed before roasting. A second stage, after roasting, either infuses additional components into the seed or topically applies components to the seed. Thus, complex flavors and functionalities can be achieved through the unique two-stage combination of components and ingredients.

Figure 1:
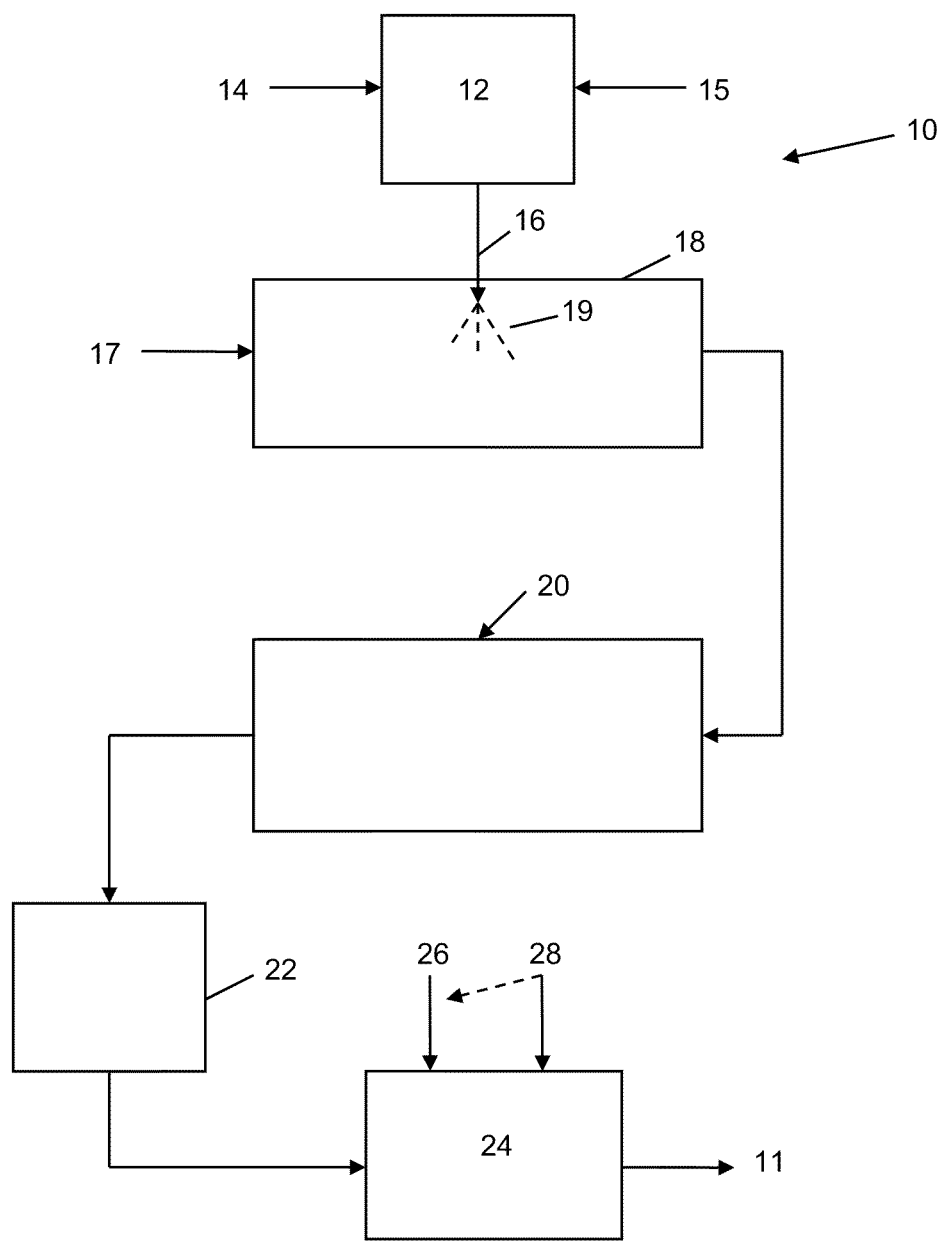
FIG. 1 is a flow chart of a process for providing the flavor-enhanced seeds.

Turning to FIG. 1 for a moment, a general process 10 for preparing roasted flavor infused seeds 11 is provided. The process 10 first prepares an aqueous infusion solution 12 by blending an amount of one or more flavor infusion components 14, such as salt flavors, nutrients, colors, functional ingredients, and/or mixtures thereof in water or a brine solution 15. Next, the aqueous infusion solution 12 is applied 16 to tumbling raw seeds 17 in a rotating or agitating apparatus 18 using a selected continuous application rate 19 effective so that both the water (or brine) 15 and the infusion components 14 infuse internally into the raw seeds 17 without substantially immersing the raw seeds 17 in a pool of the aqueous favor infusion solution. Preferably, as the raw seeds leave the apparatus 18 with the infusion components infused internally therein, they are formed with an outer surface substantially free of visibly detectable flavor infusion components.

After aqueous infusion, the infused raw seeds are immediately directed to a roasting oven 20, which can be an oil roaster or a dry roasting apparatus. After roasting, the roasted or cooked seeds may be cooled 22. Optionally, the process 10 may also include an oil application step 24 after roasting where oil 26 may be applied in amounts effective to be either infused into the roasted seed and/or surface coated to the roasted seed. Optional flavors, seasonings, or other components 28 may also then be either separately applied or included in the oil 26 to also be either surface coated or infused internally into the roasted seeds. The resultant seeds 11 are the infused roasted seeds or nuts.

Turning to more of the specifics, the seeds suitable for the processes herein are generally any raw, whole, unroasted edible nuts, seeds, beans, kernels, legumes, and the like. Examples include, but are not limited to, seeds, nuts, peanuts, almonds, pistachios, cashews, hazelnuts, filberts, macadamia nuts, Brazil nuts, pine nuts, pecans, walnuts, pine nuts, sunflower seeds, pumpkin seeds, cocoa seeds, grains, coffee beans, and the like as well as mixtures thereof. The seeds are preferably whole, meaning they are not compressed, defatted, or fractured. Whole seeds may include complete, unbroken seeds as well as partial, whole seed pieces and combinations thereof. By one approach, whole seeds generally refer to unbroken seeds and/or whole pieces thereof as long as the seeds and/or pieces are not defatted, compressed, and/or fractured internally and generally do not have substantial unnatural fissures, cracks, and/or other deformities therein.

By one approach, the starting seeds can be any raw, whole edible nuts or nut precursors which are conventionally packaged and sold as snack-type products or which are utilized for decoration or as fillers in the confectionery and baked foods industries. The raw nuts may comprise legume nuts such as peanuts, or alternatively soy beans which can be formed into soy nuts. In one example, peanuts may include, but are not limited to, Virginia, Runners, Valencia, and Spanish types, individually or in combinations thereof. Also, nuts, such as almonds, pistachios, cashews, hazel nuts, filberts, macadamia nuts, Brazil nuts, pine nuts are particularly suitable. Combinations of different nuts optionally may be used, although different kinds of nuts may have different water absorption characteristics which should be taken into account in determining the amount of water to be added to moisten the nuts. By one approach, different types of nuts may be added to the tumbling apparatus 18 at different time, rates, amounts, or other variations to account for differing water absorption characteristics.

The starting materials for the processes described herein may also be shelled seeds. Although not required, dry blanching, a mechanical process, may be used to remove or loosen skins from any seeds or nuts having skins, such as almonds, filberts, hazel nuts, and peanuts. If skins are left on the seeds during treatment, the skins tend to become loose and may be undesirable in the final roasted product from an aesthetic or marketing standpoint. However the presence of skins does not hinder or enhance the effective use of the infusion processes herein.

The raw seeds, by one approach, may be conditioned at ambient temperatures (preferably, less than about 100° F. and, in some instances, about 70 to about 100° F.) prior to roasting and infusion, but are preferably not presoaked, preboiled, preheated, compressed, defatted, or the like before roasting and infusion as that would generally cause loss of flavor compounds and lead to a roasted nut product having less satisfactory overall nut flavor. Water blanching, or any other treatment employing soaking of the seeds in excess water, is generally not desirable as it tends to increase opportunities for flavor and flavor-forming compounds to be lost from the seed into the soaking fluid prior to roasting the nuts. As discussed further below, during the infusion and application of the aqueous infusion solution, the raw seeds are pre-conditioned so that a temperature differential between the conditioned seeds and infusion solution is, by one approach, about 80° F. or less, which is believed may help aid in effectively infusing the maximum amount of water and infusion components therein.

The aqueous infusion solution applied pre-roast is a blend of flavor infusion components in water or brine forming a solution, emulsion, dispersion, or suspension of the flavor infusion components. The aqueous infusion solution may include about 0.5 to about 20 weight percent of the infusion components in water. If a brine solution is used, the water may include about 0.5 to about 20 percent flavor infusion components and/or about 5 to about 22 percent sodium chloride.

The flavor infusion components may include one or more dry or liquid, water-soluble components selected from various flavors, nutrients, colors, functional ingredients, and mixtures thereof. By one approach, the infusion components may include natural and artificial flavors, nutrients, minerals, vitamins, amino acids, antioxidants, herbs, spices, dairy ingredients, peanut kernel, sesame seed, soybean seed, dairy proteins, animal proteins, chilies, red chilies, peppers, black pepper, while pepper, red pepper, fruits, vegetables, cocoa, coffee, tea, maple flavor, maple syrup, agave, vanilla bean, vanilla flavor, mint, vinegar, sugar, honey, pomegranate, cider, orange juice or flavor, lemon, lime, cream, chocolate, garlic, caffeine, polyphenols, catechins, flavanols, tofu, caramel, jalapeno, ginger, edible acids, and mixtures thereof.

Other specific examples of the flavor infusion components may include spice and herb extracts or blends. Examples include allspice, anise, annatto, basil, bay, black pepper, decolorized black pepper, capsicum, cardamom, carrot, celery, French celery, sweet celery, chipotle, chive, cilantro, cinnamon, clove, coriander, cumin, dill, fennel, fenugreek, fried garlic, fried onion, fried shallot, garlic, ginger, green ginger, green onion, horseradish, jalapeno, kaffir lime, leek, lemongrass, mace, marjoram, mustard, nutmeg, onion, paprika, rosemary, sage, shallot, tarragon, thyme, turmeric, white pepper, and mixtures thereof. Authentic regional spice blends and extracts may also be used as the flavor infusion components. Examples include barbeque, Cajun, chili spice blends, Chinese 5-spice, curry blends, fajita, frankfurter, fried chicken, lemon pepper, nacho cheese seasoning, pepperoni, pizza, rendang, salsa, taco, tom yam, wasabi, Worcestershire, and mixtures thereof. The flavor infusion components may also include essential oils of ingredients such as essential oils of anise, basil, bay, black pepper, caraway, cassia, celery seed, cinnamon, clove (bud, leaf, stem), coriander, cumin, dillweed, fennel, garlic, ginger, green ginger, lemon, lime, marjoram, nutmeg, onion, orange, origanum, parsley, peppermint, pimento leaf, rosemary, sage (such as Dalmation, Spanish), tarragon, thyme, and mixtures thereof.

The flavor infusion components may also include natural flavors and/or colors such as annatto, paprika, black carrot, turmeric, carrot, color blends, VEGETONE® blends (blends of annatto, turmeric, paprika and/or carrot), DURABRITE® colors (high stability orange to red-orange hues from paprika), and mixtures thereof. Antioxidants may also be included as the infusion components. Examples include HERBALOX® seasonings, DURALOX® seasonings, and mixtures thereof as well as other suitable antioxidants. The flavor infusion components may also include various nutritional ingredients, for example, capsicum and capsaicin concentrates, ZEAGOLD® natural zeaxanthin, natural alpha carotene, vitamins A, B, C, D, and/or E as well as mixtures thereof. Other flavor infusion components may include smoky, sugary (sweet), spicy, lime, salty, or other flavorings, as well as combinations of flavors, may be dissolved or dispersed in the water. Functional ingredients may include, for example caffeine, polyphenols, flavanols, catechins, vitamins, minerals, probiotics, and the like. Additional flavors, colors, antioxidants, and nutritional ingredients are included in the Examples.

The aqueous infusion solution may be prepared by blending, mixing, or stirring the flavor infusion components into water or brine to form a solution, emulsion, dispersion, or suspension of the components. By one approach, the temperature of the solution may be from about 70° F. to about 200° F. and, in some cases, 100° to about 150° F. By one approach, the temperature is maintained within these ranges during application to the seeds. Alternatively, the aqueous infusion solution may be cooled prior to application; however, solution temperatures between ambient and about 200° F. generally has little effect on the amount of moisture and infusion component uptake in the seeds during application. If desired, the aqueous infusion solution may be clarified prior to application. For example, the solution may be clarified by filtering, centrifuging, screening, or other suitable processes. Filtering may include use of stainless steel screens, cellulose coffee filters, or the like. In some cases, a screen no. 170 or 200 providing 75-90 micron openings may be used.

By one approach, the aqueous infusion solution may be applied to the seeds using selected application rates, times, and methods to efficiently infuse the seeds as they are tumbled or agitated, such as in a rotating or tumbling drum. In this approach, the application rates, times, and methods are effective to increase the moisture content of the raw seed and infuse the infusion components into the seeds without soaking or otherwise immersing the seeds in a pool or excess amount of the infusion solution. Preferably, the application rates are also effective to infuse the aqueous infusion solution internally into the seed with substantially no visibly detectable surface coating of salt and/or flavor infusion components. This has been achieved by discovering that water and infusion component uptake into the seeds can be controlled by carefully limiting both the time and application amount/rate of the solution per the total amount of raw seeds. If the application rates and times are not followed, too much solution per seed is obtained resulting in excess pooling and immersion of seed in the pool of the solution, which results in the undesired effects discussed in the background. The methods herein, on the other hand, select application rates and times per amount of raw seeds to effect water and component uptake generally without forming a pool or excess amount of the solution in the process. In other words, the aqueous infusion solution is applied at rates and in amounts effective to cover and infuse the seeds without substantial runoff, pooling, and/or forming localized excess areas or portions of solution in the process.

Turning to more of the details of the solution application process, the application rate is carefully selected to infuse water and components into the seed. In one aspect, the application rate may be about 5 to about 10 grams of the aqueous flavor infusion solution per minute per kilogram of raw seeds (that is, about 5 to about 10 g/min/kg). In other approaches, this application rate may be about 8 to about 9 g/min/kg. These application rates are continuously maintained for about 2 to about 10 minutes. Thus, the infusion solution is continuously applied at the selected application rates throughout the application time period of about 2 to about 10 minutes. Any longer, it is believed that the seeds will have generally approached their maximum moisture and component uptake levels and any excess solution will not be able to be infused fast enough into the seed and will start to pool or build up.

In yet another approaches, the application rate may be reflected as about 0.5% to about 1 percent solution per minute. Application rates or times outside of these ranges generally result in undesired pooling or excess solution. As shown in the Examples, it has been discovered that the seeds approach maximum water uptake rapidly within about 10 minutes or less After this point, additional water uptake is slower and in minimal amounts. Thus, the methods herein use the selected application rates and times to achieve maximum uptake into the seed while avoiding the undesired extraction of seed components experienced with soaking of seeds in excess water as discussed in the background. In one approach, brine may be applied to the conditioned raw seeds at about 6 to about 8 percent based on the weight of the nuts over a residence time of about 3 to about 4 minutes.

In another aspect, a temperature differential between the conditioned seeds and the infusion solution is maintained within selected ranges during the application time period. While not wishing to be limited by theory, it is believed that minimizing the temperature difference between the seeds and solution may aid in water and infusion component uptake because there is not a large temperature gradient at the interface between the seed and solution at point of application. By one approach, the seeds are conditioned so that they are at a temperature of about 100° F. or less and, in some cases, between about 70° F. and about 100° F. At the same time, the infusion solution has a temperature of about 70° F. to about 200° F. so that a temperature differential between the seeds and solution is about 80° F. or less.

In one embodiment, the shelled, dry blanched seeds are placed in a revolving coating pan, drum or cylinder with a longitudinal axis of the drum aligned at a small incline relative to the horizontal (such as about 3 to about 20 degrees, for example) with the entry port at the elevated end. The drum is adapted to rotate at a rate effective to impart tumbling action to the seeds. As the drum revolves, the seeds tumble in the pan, and the infusion solution is applied to the seeds using one or more application nozzles configured to apply the correct application rate of the infusion solution throughout the application time period. During this application period, the seed moisture is increased about 60 to about 140 percent up to, in some cases, about 10 to about 15 percent total seed moisture.

After applying the infusion solution to the seeds, they are immediately roasted using either dry roasting or oil roasting techniques. As used herein, immediately generally means within about 5 minutes or less after infusion solution application. In general, roasting temperatures may be about 270 to about 400° F., and in other cases about 325 to about 400° F. By one approach, the nuts may be oil roasted in a vegetable oil, such as peanut oil, at a temperature and for a cooking period typically used for the particular type of nut being treated. Nuts may be oil-roasted in a batch cooker, or a continuous cooker that takes a steady stream of nuts through hot oil for about five minutes or other suitable residence time. If oil roasting is utilized, it has been discovered that roast times generally do not vary substantially from conventional seeds as the infused seeds do not require additional time to reach comparable moisture levels. As an example, cashew or almonds kernels infused with moisture reach a comparable moisture level after about 6 minutes of oil roasting.

In the case of a continuous dry or air roasting operation, the nuts are placed on a continuous air/water vapor pervious belt and transported through a roasting oven heated to a desired temperature. The residence time of the nuts in the oven is adjusted to provide the desired time of roasting. By one approach, the infused seeds may be air roasted at temperatures and times which will vary depending upon the particular roasting temperature employed, the particular type of nut being processed, and the degree of roasting desired. For example, the time and extent of roasting will be greater in the case of peanuts than in the case of cashews. In general, however, it has been discovered that the infused seeds should be dry roasted about 25 to about 45 percent longer, in some cases, about 3 to about 5 minutes longer, than would be traditionally done for non-infused seeds in order to achieve desired seed moisture levels after roasting.

By one approach, the roasting hot air may be provided with high humidity air, such as superheated steam vapor, such that the nuts may be evenly roasted and the moisture content reduced to less then 2% after cooling. For example, the nut surfaces may be contacted with steam or superheated steam while the nuts are conveyed through a chamber on a pervious conveyor in a gaseous atmosphere having a humidity of at least about 50%, particularly at least about 65%, more particularly at least about 75%, and most particularly at least about 90%. Preferably the gaseous atmosphere contains at least about 75% humidity. In this manner, moistening and roasting of the nuts can be done in a single operation. In a general embodiment, high humidity roasting treatment may be performed in a food treatment chamber at 325° F. to 400° F. at an air humidity of 50% to 90%, particularly about 70 to 80%, moisture for a total residence time of about 5 to about 10 minutes. Other conditions and times may also be used depending on the seed type and desired level of roasting.

Another aspect of the methods herein is the reactive development of seed color, flavors, and/or ingredients upon roasting. Under this aspect, the infusion solution includes one or more infusion components that are reactive or chemical precursor components of a food flavor, color, or ingredient desired in the seed. In this instance, the final flavor, color, and/or ingredients may be a reaction product of the precursors formed in-situ in the seed after infusion and when the seed is roasted. To this end, the final flavor, color, or ingredient may not be present in the raw seed or even after infusion, but formed as a reaction product via a reactive development of the chemical precursors and/or seed after roasting. Thus, the infusion and roasting process creates flavors, compounds, and/or ingredients that do not exist in the starting infusion solution and/or starting raw seeds. This special reaction chemistry is evidenced by sensory assessments of complex flavor profiles, unexpected surface color changes beyond mere absorption of pigments from the infusion components, and/or unexpected increases in various compounds in the seed that are not normally expected to be present in such levels.

By one approach, the reactive or chemical precursor components may include, among other infusion components, sugars (e.g., fructose, sucrose, etc.), dairy ingredients, dairy proteins, animal proteins, fruits, fruit extracts, vegetables, vegetable extracts, peanut peptides, amino acids, fatty acids, endogenous enzymes, peanut extracts, sesame seed extract, and mixtures thereof. Suitable enzymes may include proteases, amylases, glucanases, hexosidases, lipases, invertases, and mixtures thereof. These components undergo chemical reactions upon experiencing the elevated temperatures of roasting to chemically change or form into a reaction product to produce unexpected and complex flavors, colors, and ingredients internally within the seed. By one approach, it is believed that the reactive or chemical precursors enhance or build upon the cooking reactions that may take place in seeds during roasting by selective enhancement of particular reactive components needed to achieve desired reaction products.

By one approach, reactive development results in unexpected seed color changes that are above and beyond any color changes due to pigments found in the infusion components. This aspect is reactive color development in the seeds. Some examples are discussed here, others are provided in the Examples. By one approach, infusion of at least about 2 weight percent sugar into seeds as a chemical precursor effects reactive color changes beyond pigment infusion of components as evidenced by a decrease in CIELAB L* values. While not wishing to be limited by theory, such reactive color development may be due to Maillard reactions. In another approach, infusion of fruits and/or vegetables as a reactive or chemical precursor effects reactive color development because the sugars, free amino acids, and peptides in the fruits and vegetables develop reactive colors because it is believed they may enhance the synthesis of melanoidin compounds in the roasted seeds. In yet another approach, infusion components of raw peanut or raw sesame seeds boosted roasted color development beyond what would normally be expected from non-infused seeds or even simple water infusion into seeds. Again, this can be evidenced through changes in CIELAB L* values.

In another aspect, reactive development results in unexpected flavor and compound formation due to enhanced or additional reaction products in the seed. This aspect is reactive flavor development in the seeds. By one approach, reactive flavor development results in enhanced roast reaction products that develop about 30 to about 170 percent greater generation of five key pyrazine compounds than non-infused products. Reactive flavor development may result in increases in methyl pyrazine; 2,5-dimethyl pyrazine; 2-ethyl, 6-methyl pyrazine; 2-ethyl, 5-methyl pyrazine; trimethyl pyrazine; and combinations thereof. Enhancement of these reaction components may be particularly enhanced when using sugars, and/or peanut or sesame extracts, peptides as the chemical reaction precursors. Further details are set forth in the Examples sections. In yet another approach, reaction or chemical precursors may include individual ingredients of a final flavor or seed ingredient. For example, reaction precursors may include cocoa, dairy cream and sucrose. The reaction flavor development for the reaction product of these ingredients forms a chocolate flavor in the final product. The individual infusion of cocoa, cream, and sucrose pre-roast would not form a chocolate flavor. Only after roasting do these components interact to form the chocolate flavor.

The continuous flow of roasted nuts emerging from the roasting zone preferably is carried by a continuous belt conveyor and transferred immediately to an adjoining cooling chamber or zone in which the temperature of the nuts is reduced rapidly, within a period of about 5 minutes and preferably less than about 2 minutes, to a temperature of about 130° F. or below. This operation serves to terminate roasting of the heated nuts emerging from the high humidity heating chamber and ensure that excessive roasting of the nuts does not occur. This latter zone may include a closed or partially closed area through which air or inert gas, at temperatures of about 130° F. or less, is caused to flow at a rate sufficient to achieve the desired reduction in temperature of the nuts. The efficiency of this cooling step is greatly enhanced by transporting the nuts through the cooling zone on a conveyor belt which is perforated to permit passage of cooling air or inert gas. A particularly preferred embodiment employs a continuous wire mesh belt conveyor permitting maximum contact between cooling gas and the nuts. The nuts may be agitated by a horizontal mechanical mixer as they are being transferred from the roasting zone to the cooling zone or within the cooling zone.

The dry-roasted nuts which result from the above combination of steps may thereafter be packaged in any appropriate manner for marketing. The roasted nuts may be packed in containers ranging in size from single snack size bags, to large cans and jars. The roasted nuts also may be mixed with other nuts and/or dried fruits for snack foods or introduced as pieces in food compositions.

The methods described above prepare roasted nuts and seeds with a natural appearance and enhanced flavor, ingredient, and nutrient content by adding infusion components in an aqueous infusion solution prior to cooking or roasting for optimum eating quality. The infusion components are infused internally into the nut and, by one approach, do not present any visibly detectable components on an outer surface thereof. Thus, the infused nuts have the appearance of a natural roasted nut, but provide the unexpected flavor, nutrient, and/or functional enhancement due to the infused components.

In some instances, the infusion components and/or salt of the brine solutions when applied used the methods described above may penetrate a distance internally to the seed. In some cases, salt may penetrate between about 1 and about 4 mm internally into a seed upon infusion using the method described herein. It is expected that other infusion components may penetrate internally into a seed in a like manner. Of course, seed penetration may vary depending on seed variety, size, density, and other factors. Further details are explained in the Examples section.

If desired, a post-roast application of oil, flavors, nutrients, seasonings, and/or other functional ingredients may also be utilized after the seeds have cooled. By one approach, the post-roast application of ingredients may be infused internally to the seed or, by another approach, the post-roast application may include one or more components applied to the seed outer surface. The application of components to the outer surface may include flavors, nutrients, and/or functional components such as those described above. Alternatively, the application of components to the outer surface may include a marker or other indicia to indicate the identity of the flavors or other components infused internally to the nut. As appreciated by the above, because the infusion components are infused internally to the seed with substantially no visibly detectable surface coatings thereon, it is not readily apparent what flavor or other eating experience the consumer should expect. Thus, another feature of the described methods are to provide optional indicia or markers on the seed surface representing the infused flavor or component to provide a visual identification or a visual clue as to what eating experience the consumer should expect. An example may be red colored specs or flakes to indicate a red pepper flavor or infusion, or black pepper flakes to indicate pepper flavors or infusions. Other examples are, of course, appropriate depending on the particular flavors involved.

For infusion of the post-roast components in the seed to form a dual infused product, select application of oils and lipids using an application rate to achieve substantially complete infusion into the seed is selected. By one approach, oil or solutions of oil and oil-soluble ingredients can be entirely absorbed into the seed interior if the application rate of the oil is below about 1 percent or less and, in some cases, about 0.1 to about 0.5 percent. The post-roast oil infusion may, thus, infuse a second component or second flavor, nutrient, or functional component into the seed. By one approach, the post roast oil may include between about 0 and about 5 weight percent of the second infusion component(s).

By one approach, the second infusion component is preferably an oil-soluble component or extract. Examples include, natural extracts of Jalapeno chili, black pepper, ginger, cilantro, lime, and lemon. Oils may also include suspended components, such as chili, garlic, rosemary or any of the above described components for the pre-roast application. Oil-soluble solutions may further include chocolate, maple, brown sugar, caramel, mango, papaya, and tropical fruit flavors. Other examples may include oil of black pepper, oil of ginger, cilantro lime, Jalapeno, ginger, oil of lemon, coffee, chocolate, avocado oil, olive oil, garlic, chili, and mixtures thereof. In other examples, the blended components may include herbs, basil, oregano, spices, lemon, ginger, chili, garlic, cilantro, lime, pepper, chocolate, coffee, maple, vanilla, caramel, brown sugar, fruits, onion, sugar, paprika, peppercorns, and mixtures thereof.

In yet another approach, the post-roast application of oil may by applied at greater than 1 percent, such as between about 1 and about 10 percent, and in some cases about 1 and about 8 percent, so that not all the oil and, thus, not all the second components in the oil are absorbed into the nuts. In this approach, the oil may include from about 0 to about 5 percent of flavors, nutrient, and functional components blended therein. Using this approach, at least a first portion of the oil and blended components may infuse into the seed while a second portion of the oil and blended components may remain on the seed surface.

In addition to the post-roast application of oil, the roasted seeds may also include a dry or powdered seasoning applied to the seed outer surface. By one approach, the dry or powdered seasoning may include salt and/or another dry seasonings selected from lemon, ginger, chili, garlic, cilantro, lime, pepper, chocolate, coffee, maple, vanilla, caramel, brown sugar, fruits, onion, sugar, paprika, peppercorns, and mixtures thereof. By another approach, the seeds may have deposited thereon about 0.5 to about 6 percent, in some cases, about 0.5 to about 3 percent, powdered seasonings including the salt and/or other seasonings. These powdered seasonings may remain on an outer surface of the seed so that the roasted seeds develop both an infused component and an external component.

If the powdered seasoning is salt, the roasted seeds may include a two-stage salt application where the first salt stage is infused internally into the seed via the selected application of brine as described above. Then a second application of salt is applied via the post roast salt application on the external surface. In this approach, the roasted seeds may include about 0.3 to about 2 percent (preferably, about 0.5 to about 1.8 percent) salt infused internally into the seed kernel and about 0.3 to about 2 percent (preferably, about 0.5 to about 1.8) salt deposited externally to the seed's outer surface.

With these optional approaches, the process includes a two-stage infusion of ingredients into seeds forming a finished product where the normal roasted seed flavors mixes with complex added flavors in the interior of the seed such that a new combined taste develops after chewing, rather than the more conventional flavored snack nuts where added flavor on the kernel surface is more spatially separated from the roasted nut flavor in the kernel internal. By this approach, the two-stage infusion combines infusing water soluble components pre-roast utilizing the infusion solutions and a post roast infusion of oil and oil-soluble flavors combined with optional surface applied ingredients or flavors.

Most prior roasted snack nuts have their flavor added as an external coating. The infused nuts herein, in one approach, have a completely natural appearance with no external coating. Thus, substantially no adhesives, such as maltodextrin or gelatin, would be required and yet the infused finished product retains the intended flavor or other ingredient. In one approach, the final roasted seeds may include roasted flavors, salt, and added flavors due to the infusion process. By one approach, the resultant flavor obtained from the infusion may be between about 0.1 and about 3 percent by weight of the seeds. Salt infusion may be from about 0.3 to about 2 percent by weight. In another approach, the flavor may be about 1 to about 3 percent. In some cases, the flavor may be about 0.5 to about 10 mg/ounce of seeds of caffeine. The seeds may also include theobromine in an amount from about 5 to about 6 mg per about 28 grams of seeds. The seed may also include catechins in amounts from about 400 to about 450 micrograms per gram of seeds. In general, the roasted infused seeds may have the compositions as set forth in Table 1 below. The composition may vary depending on whether the seeds experienced one or two stages of infusions and/or whether the post roast application of oil or other ingredients are applied. Table 1 is provided as only a guideline for examples of infused roasted nuts obtained from the processes described herein.

TABLE 1

Weight Composition of Finished Product

| Component | Example Amt 1, % (w/w) | Example Amt 2, % (w/w) |
| --- | --- | --- |
| Seed kernel | 90-99 | 90-99 |
| Water-soluble Infused components | 0-10 | 0.1-3 |
| Infused Salt | 0-2 | 0.5-1.8 |
| Sucrose | 0-1 | 0-1 |
| oil-soluble components | 0-5 | 0-3 |
| Seasonings | 0-6 | 0.5-3 |
| Surface Salt | 0-2 | 0-1.5 |

The Examples that follow are intended to further illustrate, and not limit, embodiments in accordance with the methods disclosed herein. All percentages, ratios, parts, and amounts used and described herein are by weight unless indicated otherwise.

EXAMPLES

Comparative Example 1

Figure 2:
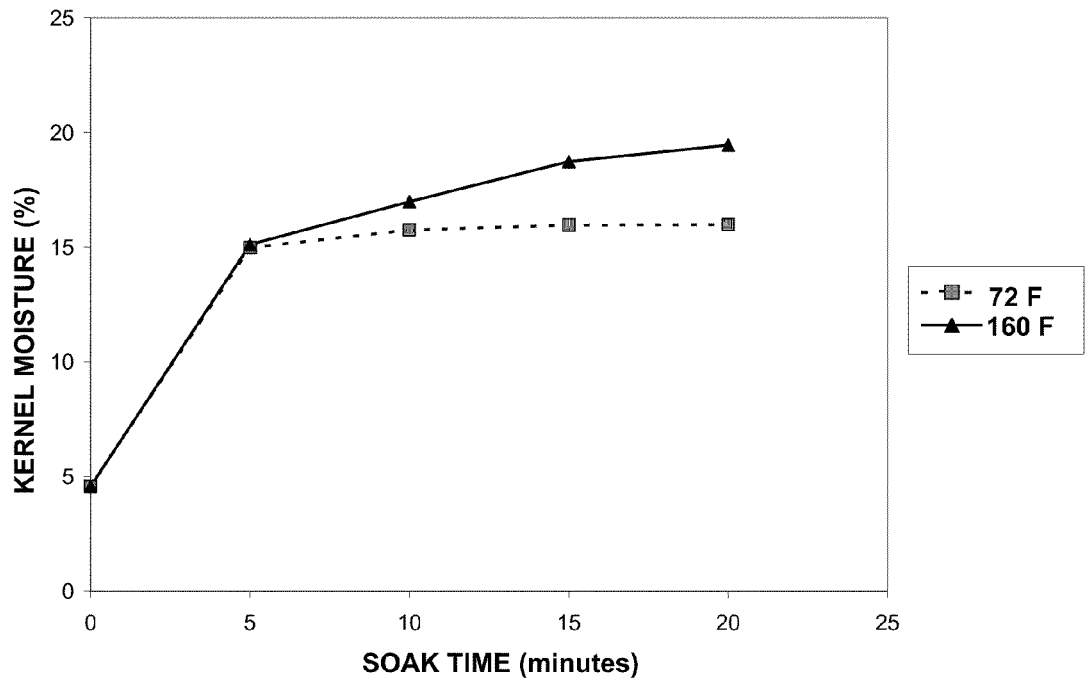
FIG. 2 is a graph of moisture uptake.
Figure 3:
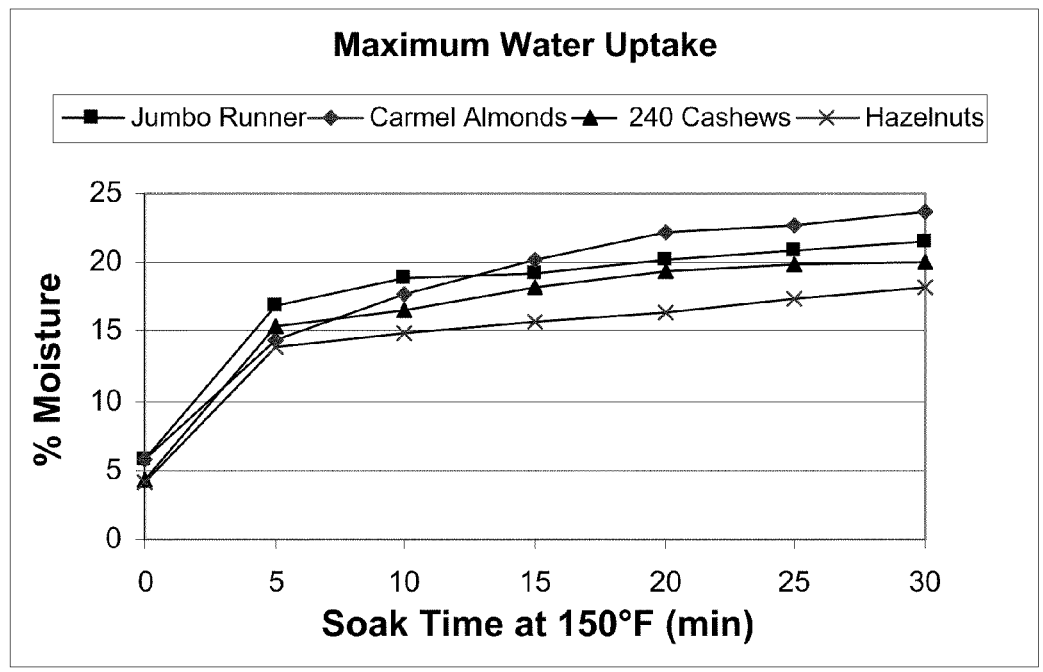
FIG. 3 is a graph of moisture uptake of various nut types.
Figure 4:
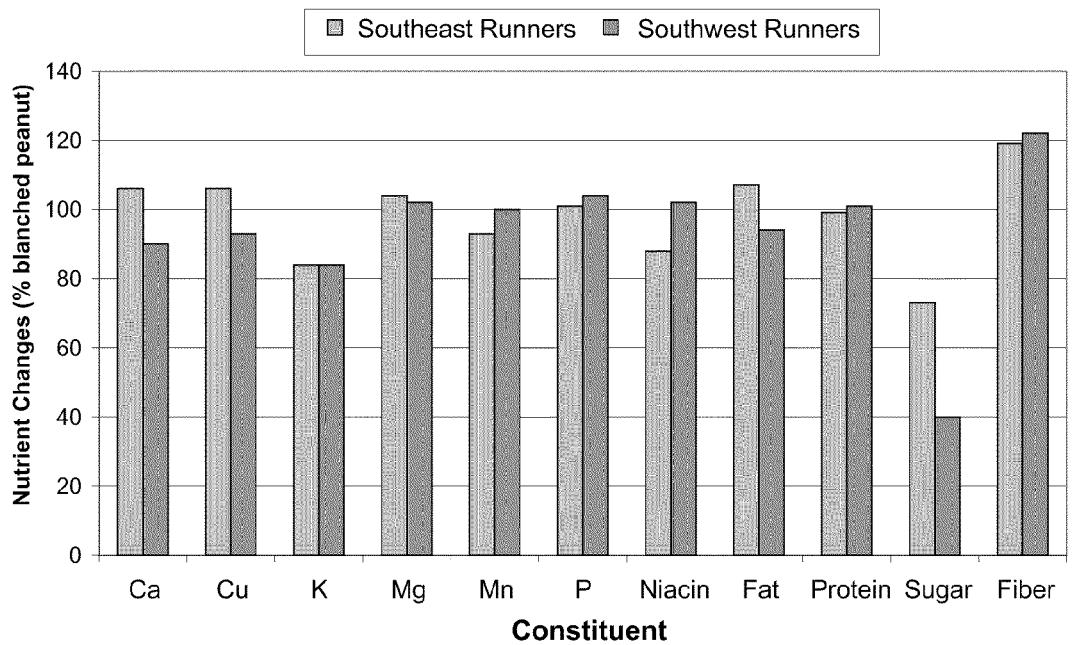
FIG. 4 is a graph of the effect of excess water soak on peanut composition.

This example studies a prior peanut manufacturing process that uses a precook soaking in excess hot water prior to roasting. FIG. 2 shows that the maximum rate of moisture uptake by uncooked peanut kernels occurs in about the first 5 minutes of soaking in excess water. As shown in Table 2 below, temperature of the soaking solution from ambient to 200° F. generally does not have a large impact on the amount of moisture the peanut kernels can absorb. In another study on uncooked peanuts, almonds, cashews, and hazelnuts as shown in FIG. 3, similar patterns of moisture uptake during soaking in excess water at 150° F. in seen. As explained in the background, there are several negative aspects of soaking kernels in excess water. FIG. 4 shows that soaking two types of peanut kernels in excess water at 180° F. extracts out soluble seed constituents, such as sugar, into the excess water. While not wishing to be limited by theory, it is believed that such seed constituent extraction may account for reduced flavor and/or color obtained during subsequent roasting. The buildup of soluble constituents in the soaking water may also render it difficult to make a uniform finished product because concentration of these soluble components varies with time.

TABLE 2

Blanched Peanut Moisture After 10 Minute Soak at Different Temperatures

| Soak Temperature, ° F. | Kernel Moisture, % | |
| --- | --- | --- |
| | Southwest Jumbo Runner | Southeast Jumbo Runner |
| none | 5.32 | 4.76 |
| 160 | 18.27 | 16.06 |
| 170 | 17.93 | 16.31 |
| 180 | 18.24 | 17.42 |
| 190 | 18.13 | 17.49 |
| 200 | 20.3 | 18.57 |

Example 2

Figure 5:
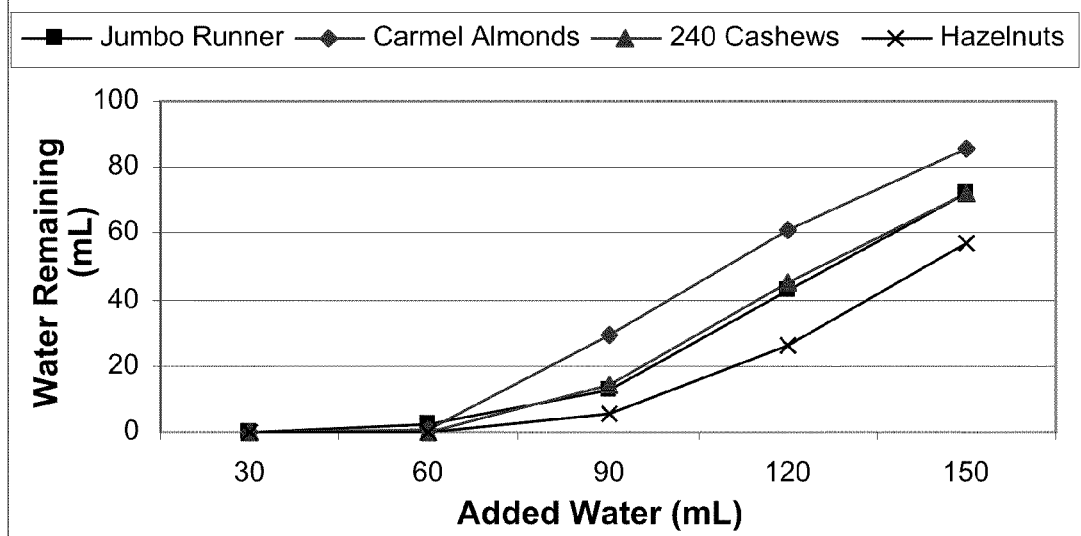
FIG. 5 is a graph of water remaining in a coating drum.
Figure 6:
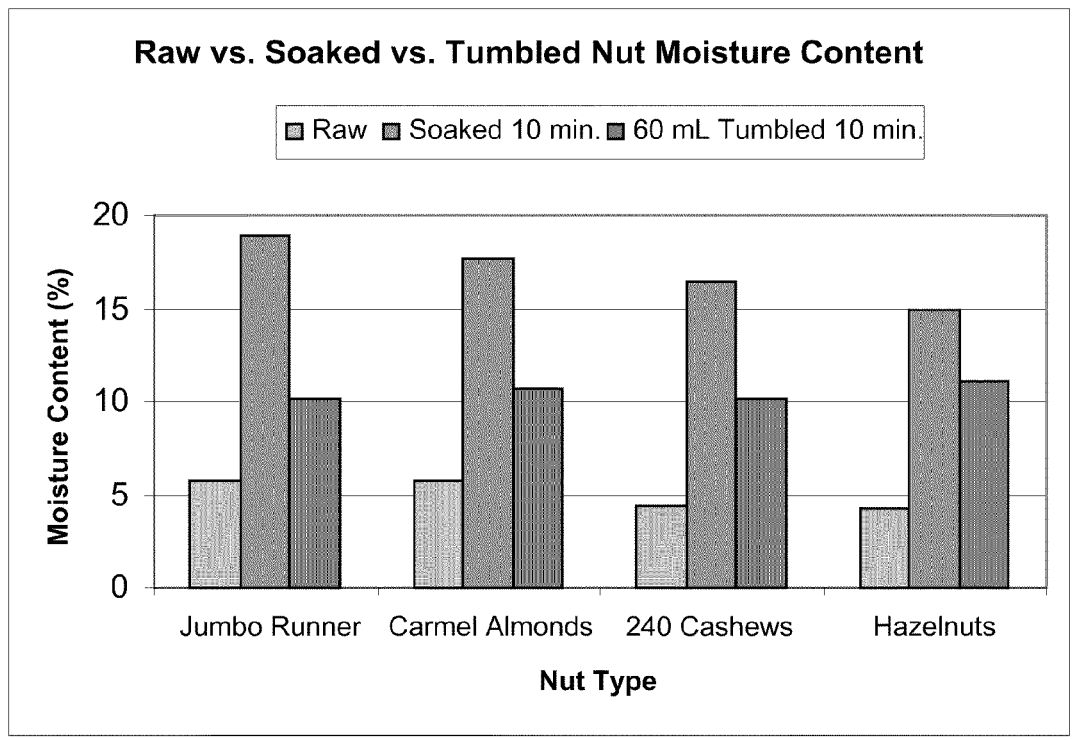
FIG. 6 is a graph of nut moisture content as compared between raw, soaked, and tumbled nuts.

This Examples studies application rates of water relative to the amount of water remaining in a rotating coating drum. FIG. 5 shows a lab test where about 700 g of uncooked jumbo runner peanuts, caramel almonds, cashews, or hazelnuts were coated for about 10 minutes in a rotating coating drum with various amounts of water heated to 150° F. An application rate of about 9 grams of fluid/min/kg of kernels corresponds to a 60 mL application value in FIG. 5. As shown in FIG. 5, when the application rate exceeded this level, excess fluid was seen to accumulate in the processing equipment. In the rest of the Examples, if the application rate is not specified, the application rate for a 10 minute precook infusion period about 9 g fluid/min/kg kernels. FIG. 6 compares moisture levels of raw, nuts soaked in excess water, and the inventive nuts.

Example 3

Figure 7:
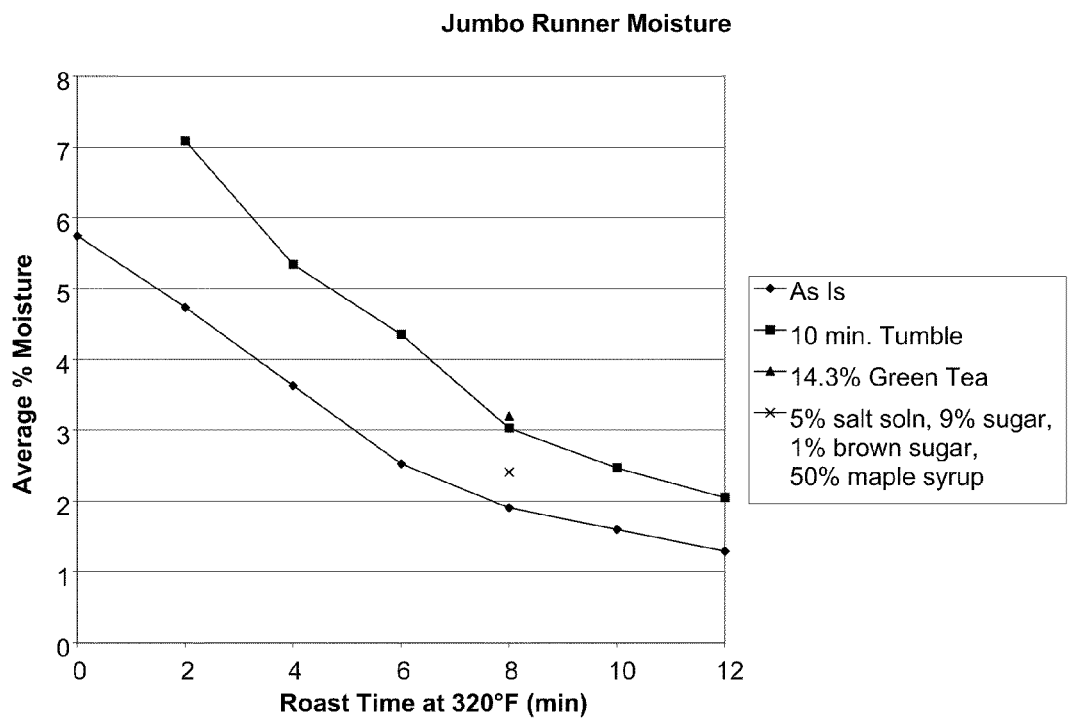
FIGS. 7-10 are graphs of moisture following forced air roasting for various nut types.
Figure 8:
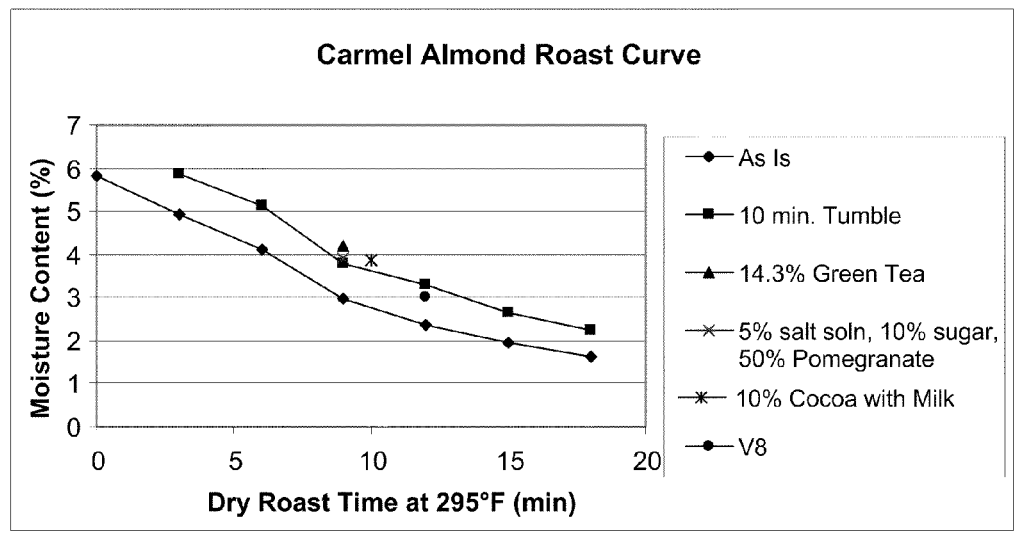
Figure 9:
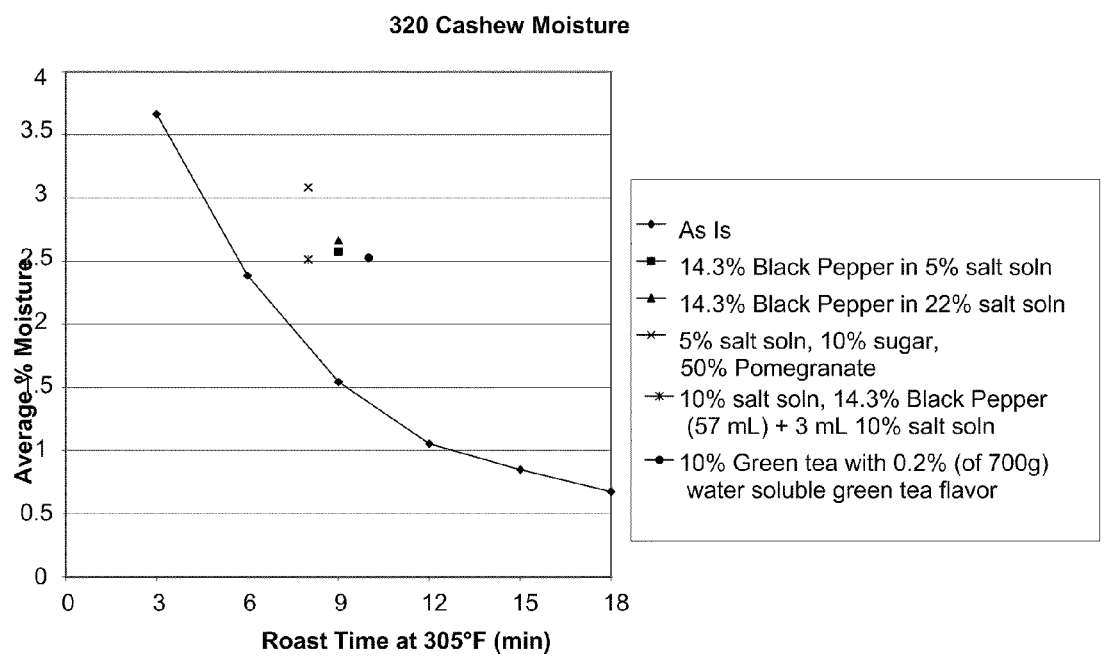
Figure 10:
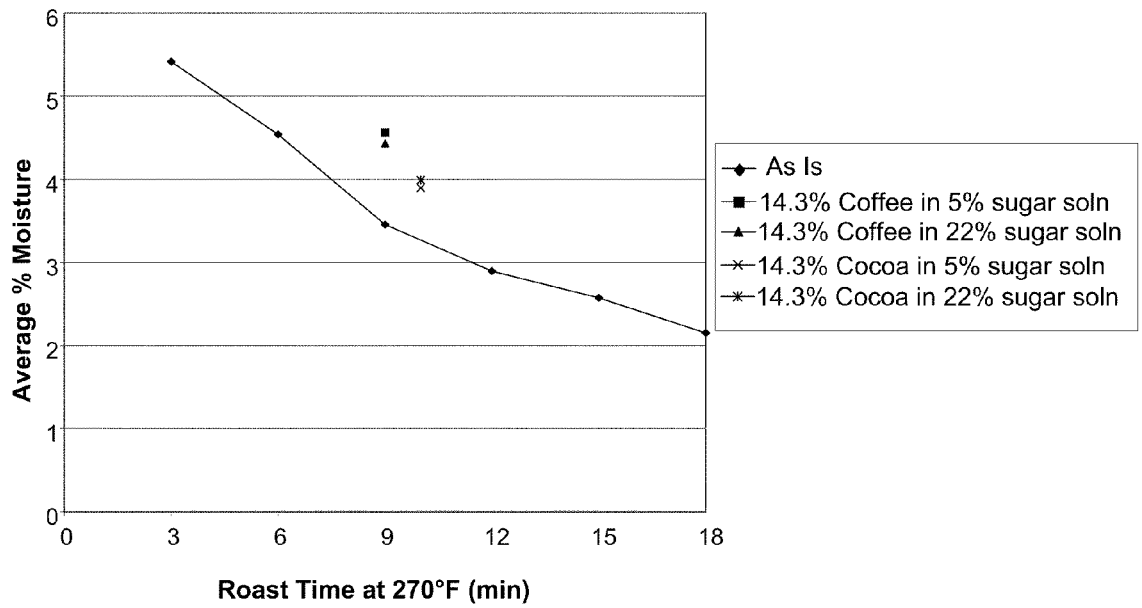

In this Example, the impact of a pre-roast aqueous infusion at about 9 g/min/kg kernels for about 10 minutes on roast flavor, appearance, and texture for eating quality was evaluated during dry roasting of peanuts at 320° F. (FIG. 7), of almonds at 295° F. (FIG. 8), of cashews at 305° F. (FIG. 9), and hazelnuts at 270° F. (FIG. 10). FIGS. 7 and 8 show that pre-roast infused kernels have relatively higher moistures at any given time point in the roasting treatment as compared to kernels that are being dry roasted without any pre-roast infusion (as is moisture content). The graphs show that the moisture content during dry roasting is similar whether the infusion solution was water, or included the infusion components of aqueous extracts of green tea, sugars, salt, coffee, or cocoa. The tests with dry roasting of cashews and hazelnuts show that infusion with aqueous extracts such as coffee, black pepper, salt, sugars, pomegranate, cocoa, or green tea also delays the dehydration process relative to untreated kernels (as is).

Table 3 below summarizes the longer roast times needed for precook infused kernels to reach the same optimum moisture content as untreated kernels (as is moisture). Overall, for a given temperature, precook infused kernels take about 25 to about 43% more time to roast.

TABLE 3

Dry Roast Conditions Based on Kernel Moisture

| | | | Roast Time, minutes | |
| --- | --- | --- | --- | --- |
| Kernel Type | Dry Roast Temperature, ° F. | Target Finished Product Moisture, % | As Is Raw Kernels (Control) | Infused Raw Kernels |
| Peanut | 320 | 1.7 | 9 | 12 |
| Almond | 295 | 2.9 | 9 | 12 |
| Cashew | 305 | 2 | 7 | 10 |
| Hazelnut | 270 | 2.9 | 12 | 15 |

Figure 11:
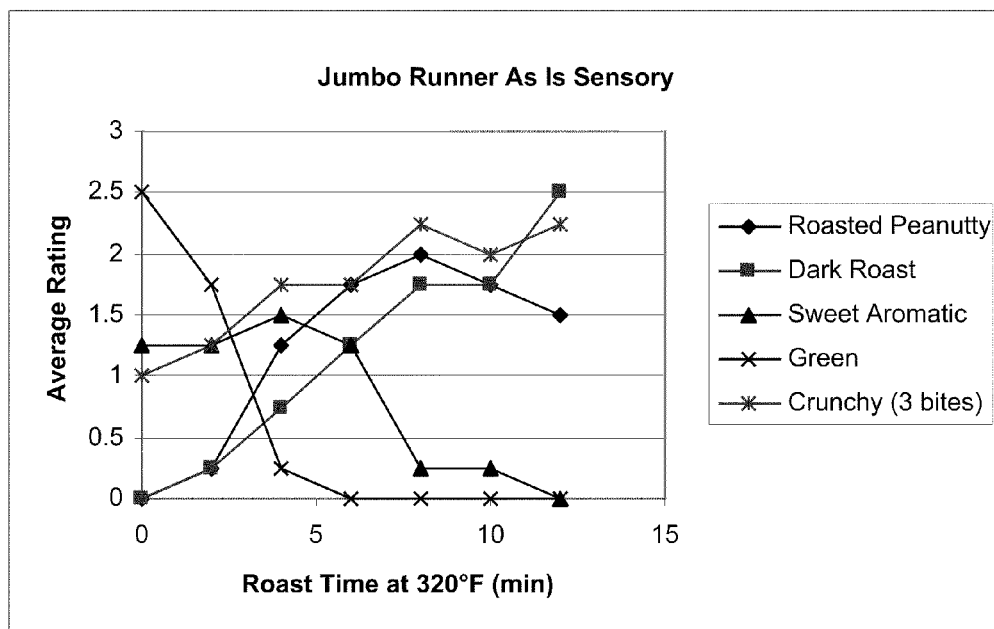
FIGS. 11 and 12 are graphs of the sensory make-up of nuts prior to and following roasting.

The impact of precook infusion on roast time was confirmed as well by using sensory science techniques, such as those developed by Johnsen et al., J. Sensory Studies 1988, 3:9-17, which is hereby incorporated herein by reference. FIG. 11 provides a comparative example of how the primary flavor attributes of roasted peanutty, dark roast, sweet aromatic, and green change during the roasting process of a non-infused Jumbo Runner peanut. The data are the average ratings of two panelists using a simplified rating scale (0 none, 1 low, 2 moderate, and 3 high) for all the attributes. The crunchy textural attribute was evaluated by a similar scale.

Figure 12:
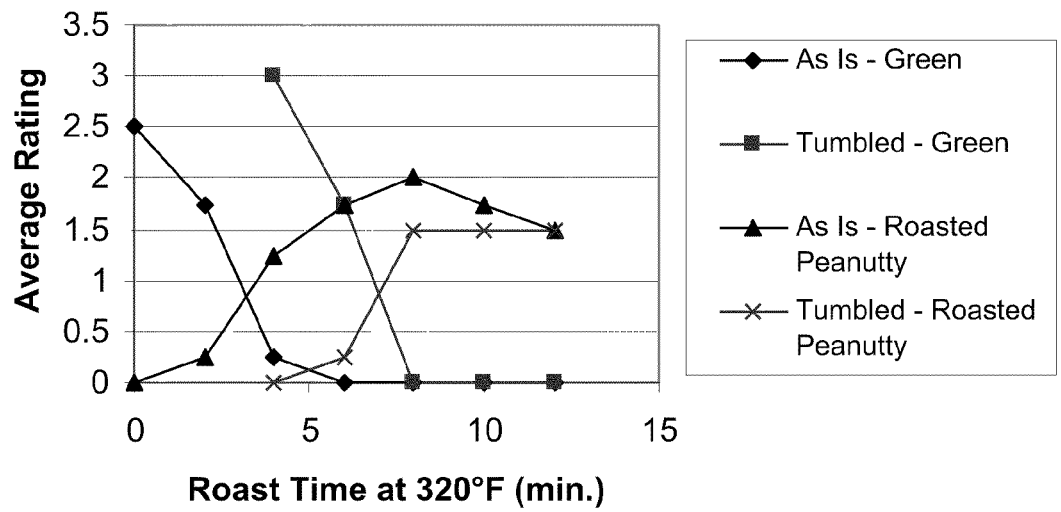

FIG. 12 shows that for precook infused peanuts, the roast level where roast peanutty is high and green attribute is low is shifted to longer roast time to correspond to the same approximate moisture content found for the roast levels on untreated peanuts (as is). For tree nuts, the sensory technique was similar except that the primary nut flavor was cashew, almond, or hazelnut flavor, respectively. The characterizing flavor of tree nuts is present in the raw kernel so roasting depends on selecting roast conditions that maximize characterizing nut flavor, balance dark roast, and eliminate green attribute. The roast condition for precook infused tree nuts occurred at the same moisture content as was found for untreated kernels, although it took more roast time to reach that point.

Example 4

Figure 13:
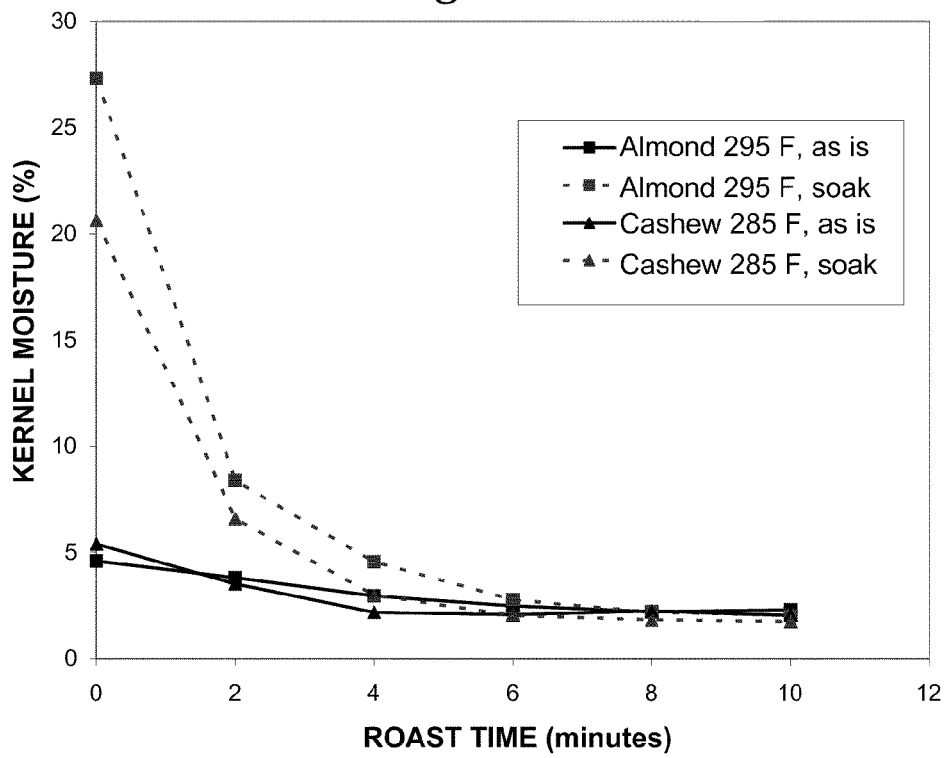
FIG. 13 is a graph of kernel moisture during oil roasting.

In this Example, oil roasting of infused seeds was investigated. In general, oil roasting equalizes the differences in starting kernel moisture more quickly than is case for dry roasting. In this Example, peanut oil was heated to the indicated temperatures (i.e., FIG. 13) in an oil fryer heated by a gas burner. Roasting is terminated at the indicated roast times by transferring the kernels unto a stainless steel mesh where forced ambient air flow cools them rapidly. FIG. 13 shows that comparative cashew or almond kernels soaked in excess water at about 180° F. for about 10 minutes reach moisture contents of about 20% or greater. Kernels from both (as is) moisture control with no infusion (5%) and infused higher moisture treatments (>20%) reach similar moisture contents after 6 minutes of oil roasting, or the time when desired roasted kernel flavor and texture is achieved. Consequently oil roast generally does not require additional roast time as is the case for dry roasting.

Example 5

Figure 14:
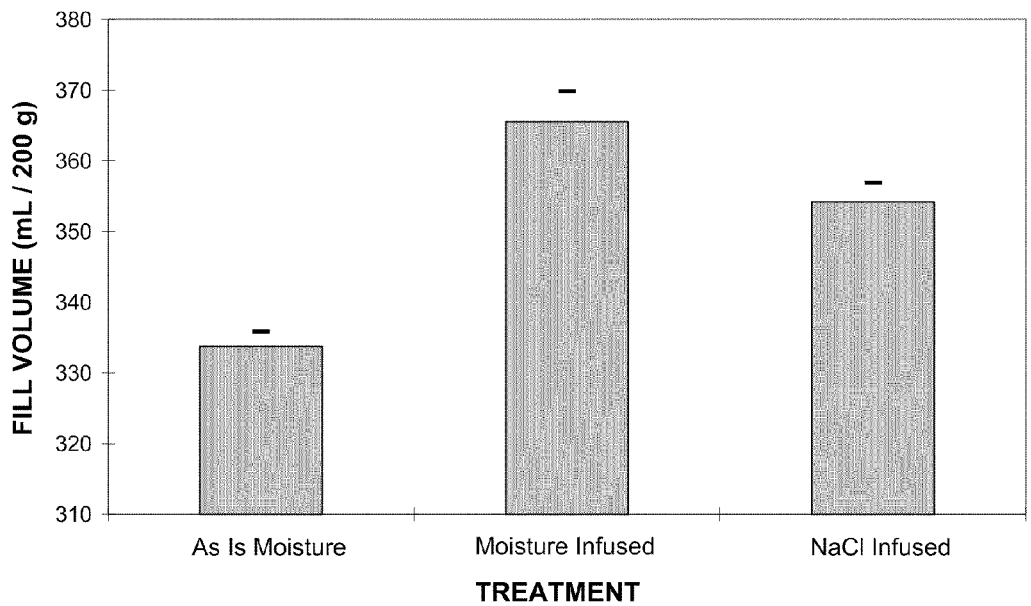
FIG. 14 is a graph of fill volume of almonds.

A study was completed to investigate the impact of oil roasting on pre-roast infused almond relative to its fill volume and texture. In this Example, about 700 g subsamples of almond kernels were tested as is (control), infused with 60 mL water at 150° F. (i.e., about 9 g/min/kg), or infused at about 9 g/min/kg with a 12% NaCl solution at 150° F. The three treatments were oil roasted for about 7.3 minutes at about 292° F. in peanut oil. The almond kernel size appeared to expand in both water infusion and salt infusion treatment versus the size of the control kernel. FIG. 14 shows that the fill volume increased by about 6 to about 10% after aqueous treatment and roasting, resulting in a reduced bulk density. This fill weight difference between control kernels and the aqueous infused kernels is a significant difference as measured by the Student's t-Test. The slash marks represent the 95% confidence interval for the mean of two sets of roasting experiments. The texture of the infused almond kernels was less hard and dense and easier to chew than normal oil roast kernels.

Example 6

Various infused seeds were prepared according to the methods described herein. Table 4 below lists fluid and dry ingredients used for making up a variety of pre-roast aqueous infusion solutions. The concentration range of the components can vary from nothing to the maximum amount indicated. The extraction process for dry ingredients took place at about 150° F. with mixing of ingredients for about 10 minutes. The solutions were applied as follows: about 700 g batches of kernels were rotated at about 32 rpm in a stainless steel coating drum while applying about 60 g of fluid over about a 10 minute period.

TABLE 4

| Ingredients For Aqueous Infusion | Concentration Tested, maximum % (w/w) |
|---|---|
| Fluid Composition (water) | |
| NaCl solution | 22 |
| balsamic vinegar | 50 |
| apple cider vinegar | 50 |
| red wine vinegar | 50 |
| pomegranate juice | 50 |
| apple cider | 50 |
| vanilla bean extract | 1 |
| mint syrup | 50 |
| bitter orange marinade | 50 |
| maple syrup | 50 |
| fresh squeezed lemons | 80 |
| fresh squeezed limes | 20 |

TABLE 4-continued

| Ingredients For Aqueous Infusion | Concentration Tested, maximum % (w/w) |
|---|---|
| sucrose water | 20 |
| brown sugar water | 2 |
| vegetable & fruit concentrates | |
| Campbell Soup Company V8$^R$ | 100 |
| Campbell Soup Company V8$^R$ Pomegranate Blueberry | 100 |
| Nestle Juicy Juice$^R$ Harvest Surprise Orange Mango | 100 |
| cow's nonfat milk liquid | 90 |
| cow's milk Half & Half liquid | 90 |
| cow's dry nonfat milk in water | 14 |
| Water Soluble Dry Commercial Flavors | |
| chocolate | 20 |
| maple | 20 |
| green tea | 10 |
| cherry | 5 |
| Dry Commodity Ingredients | |
| Hershey Cocoa, Natural | 20 |
| Ghiradelli Double Chocolate Hot Cocoa | 15 |
| alkalized cocoa | 20 |
| green tea | 20 |
| ground, roasted Columbian coffee | 20 |
| McCormick Ground Black Pepper | 20 |
| McCormick Ground Cayenne Red Pepper | 15 |
| McCormick Grill Mates Mesquite | 15 |
| Mrs. Dash$^R$ Seasoning Blend | 12 |

Example 7

A screening sensory test was used to evaluate the strength of the added flavor system and to grade acceptability of total flavor delivery of the finished product for a series of product prototypes created using the processes as shown in FIG. 1 using a trained panel of expert sensory testers. The ratings were the average value for two panelists based on a 0 to 5 numerical scale where 0=none, 1=low, 2=some, 3=medium, 4=good, and 5=high.

A black pepper extracts was evaluated as examples of flavors systems in both pre-roast aqueous infusion and post roast applications. Table 5 below shows examples where cashew and almond kernels were infused with about 14% black pepper extract which was extracted in the indicated NaCl solution and then dry roasted. In some cases about 0.1 to about 0.2% amount of black pepper oil was added post roast. The taste test shows that aqueous extracts of black pepper are a strong added flavor with good acceptability. The addition of oil of black pepper increases the flavor strength within the product and decreases taste acceptability presumably because the flavor delivery was too strong. Furthermore, the cashew kernels infused with about 5% NaCl solution have about 43 mg sodium per about 28 gram serving as measured by emission spectroscopy, which would be a lightly salted nut as compared to full salt levels of about 100 to about 200 mg sodium in regular commercial products. The relatively high scores for product acceptability decreased to a low value of 1 when cashews were infused with aqueous solutions of about 22% NaCl and black pepper extract similar to the experiments shown in Table 5. The low acceptability score with about 22% NaCl infusion was based on excessive saltiness in this product prototype.

TABLE 5

Screening Roundtable Evaluation of Black Pepper Extracts on Flavor Strength and Acceptability

| Kernel Type | Pre Roast Aqueous Infusion | Post Roast Oil Flavor Infusion | Finished Product, scale (0 none to 5 high) | |
|---|---|---|---|---|
| | | | Added Flavor Strength | Acceptability |
| Cashews | 14% (w/w) black pepper extract, 5% (w/w) NaCl | none | 4 | 3.5 |
| Cashews | 14% (w/w) black pepper extract, 5% (w/w) NaCl | 0.2% (w/w) Kalsec Oil of Black Pepper | 4.5 | 2.75 |
| Cashews | 14% (w/w) black pepper extract, 10% (w/w) NaCl | none | 3.25 | 3.5 |
| Cashews | 14% (w/w) black pepper extract, 10% (w/w) NaCl | 0.2% (w/w) Kalsec Oil of Black Pepper | 4.25 | 2 |
| Almonds | 14% (w/w) black pepper extract, 7% (w/w) NaCl | none | 2.25 | 3.5 |
| Almonds | 14% black pepper extract, 7% (w/w) NaCl | 0.1% (w/w) Kalsec Oil of Black Pepper | 4 | 2.75 |

In another Example, a simplified process for making salt and black pepper flavored kernels was tested with cashew, peanut, and almond kernels which takes advantage of the strong flavor delivery and balanced taste of Kalsec black pepper oil. In this test, kernels were infused with about 5 to about 15% NaCl from the aqueous infusion solution, roasted, and then post roast infused with about 0.1 to about 0.3% weight of the black pepper oil without any aqueous infusion of black pepper aqueous extract. Both the salt and pepper flavor strength and overall product acceptability were good. This salt and pepper formula would eliminate the aqueous extraction of black pepper, and thus simplify and increase the efficiency of the manufacturing process. A simplified infusion process could be used when well-balanced natural flavor extracts exist, which can be applied post roast to a kernel matrix already infused prior to roasting with simple taste components such as salt or sugar.

In another Example, kernels were infused with about 12% NaCl, oil roasted for about 7 minutes at about 292° F. in peanut oil, and flavored post roast with oil-soluble flavors of Jalapeno chili or cilantro lime at about 0.2% active ingredient concentration. The finished products had intense and complex flavor profiles because the added flavors post roast were not heated and retained the total flavor chemistry of the starting extract. The simplified aqueous infusion step would reduce the release of extract components into the roaster oil, and consequently, would reduce maintenance and cleanup processing on the used roaster oil.

Example 8

Figure 15:
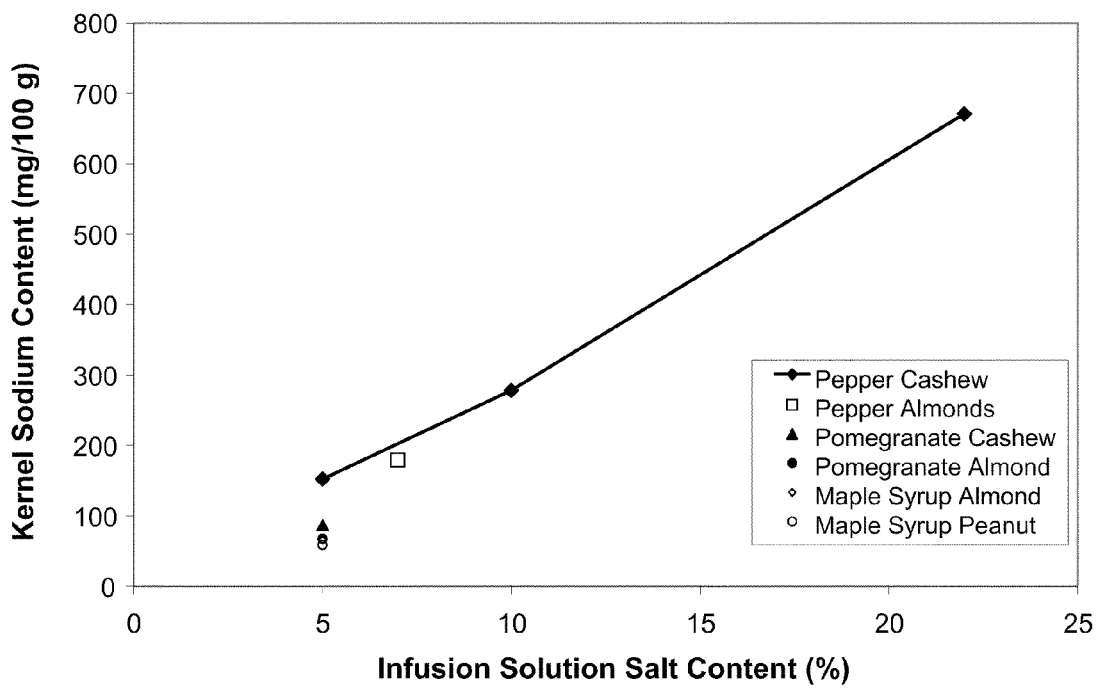
FIG. 15 is a graph of sodium infusion into nuts.

In this Example, the ability of the aqueous infusion processes described herein were studied to determine the range of salt concentrations in a finished product. FIG. 15 shows an approximately linear relationship between the amount of sodium in a black pepper extract brine infusion solution and the amount of sodium in the finished product. Other examples show that more viscous infusion extracts, like maple syrup and pomegranate juice, do not transfer the usual amount of sodium into the kernel interior. For example, the measured sodium content in the finished product was about 83 to about 90% (n=4) of the calculated amount in the black pepper extract, whereas the finished product sodium was about 35 to about 52% (n=4) of the theoretical amount in the maple syrup or pomegranate extracts.

While not wishing to be limited by theory, it appears that the more viscous fluids may generate residue buildup on the kernel surface in these treatments which may inhibit fluid diffusion into the kernel interior, and possibly such deposits with associated sodium ions are then wiped off the kernel surface with handling during the process to account for unexpectedly low kernel sodium content. Surface buildup on kernels can be considered a positive attribute if changes in product appearance are a goal. After dry roasting, kernels infused with sugars and maple syrup or fruit extracts have very shiny and glossy surface coating. This type of surface shine is usually associated with higher temperature cooking conditions where there is direct heat transfer in a kettle.

Figure 16:
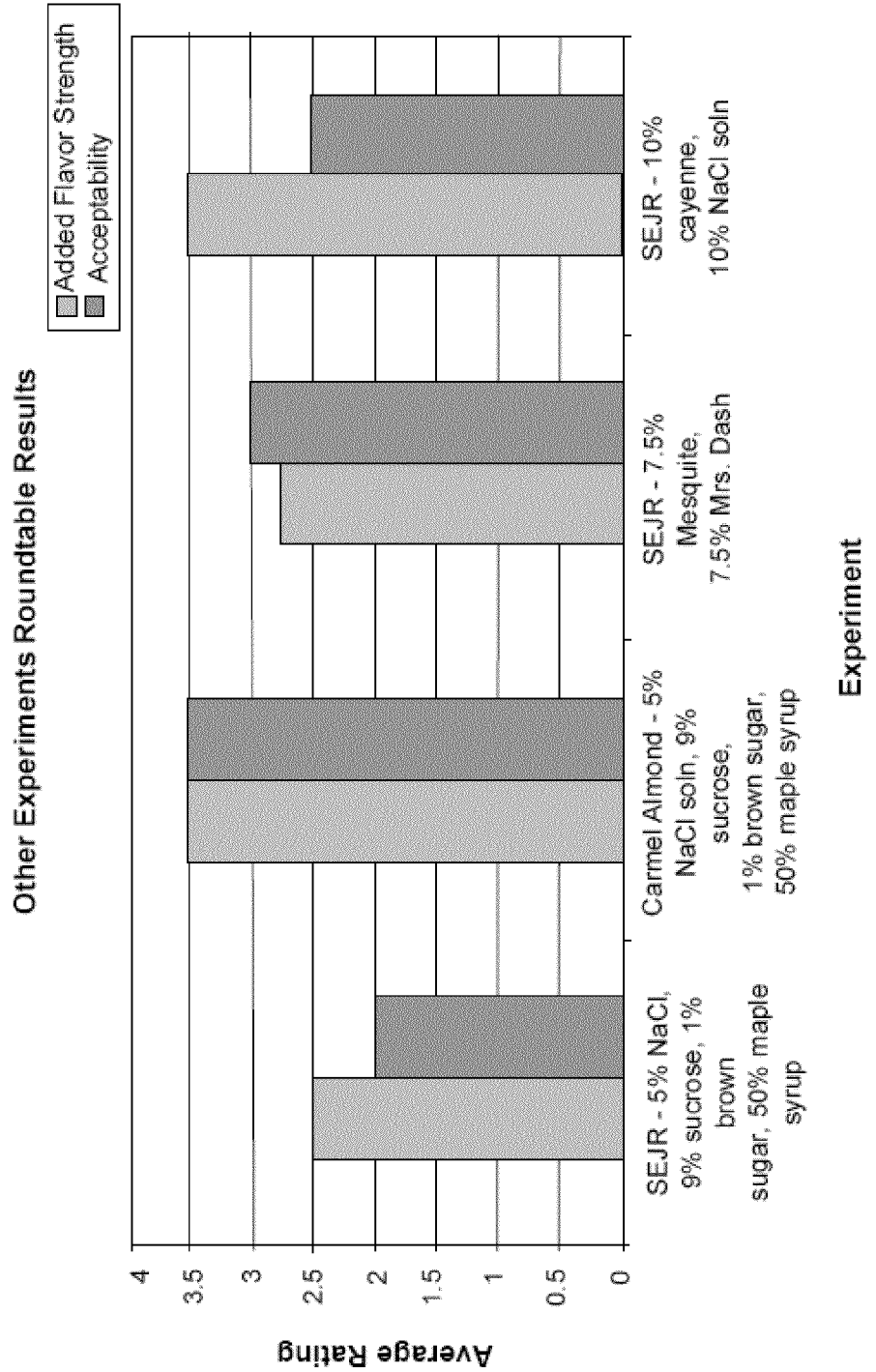
FIGS. 16 to 21 are graphs of sensory ratings for various infused flavors.

FIG. 16 shows the relatively high sensory ratings of 3.5 for both added flavor and acceptability of the maple syrup infused almond kernels prepared using an infusion extract of about 50% of a mixture of about 5% NaCl, about 9% sucrose, and about 1% brown sugar with about 50% maple syrup. The same infusion of peanut kernels (SEJR) was acceptable, but less preferred, which demonstrates how the roasted kernel flavor profile can influence consumer acceptance of the total flavor system. Peanut kernels (SEJR) infused with extracts of salt and red pepper, or mixtures of spices and herbs also are rated fairly highly in both added flavor and acceptability. All four product prototypes shown in FIG. 16 could be formulated to have low sodium content of less than about 50 mg per 28 g serving if the NaCl concentration in the aqueous infusion was about 5% or less.

Example 9

Figure 17:
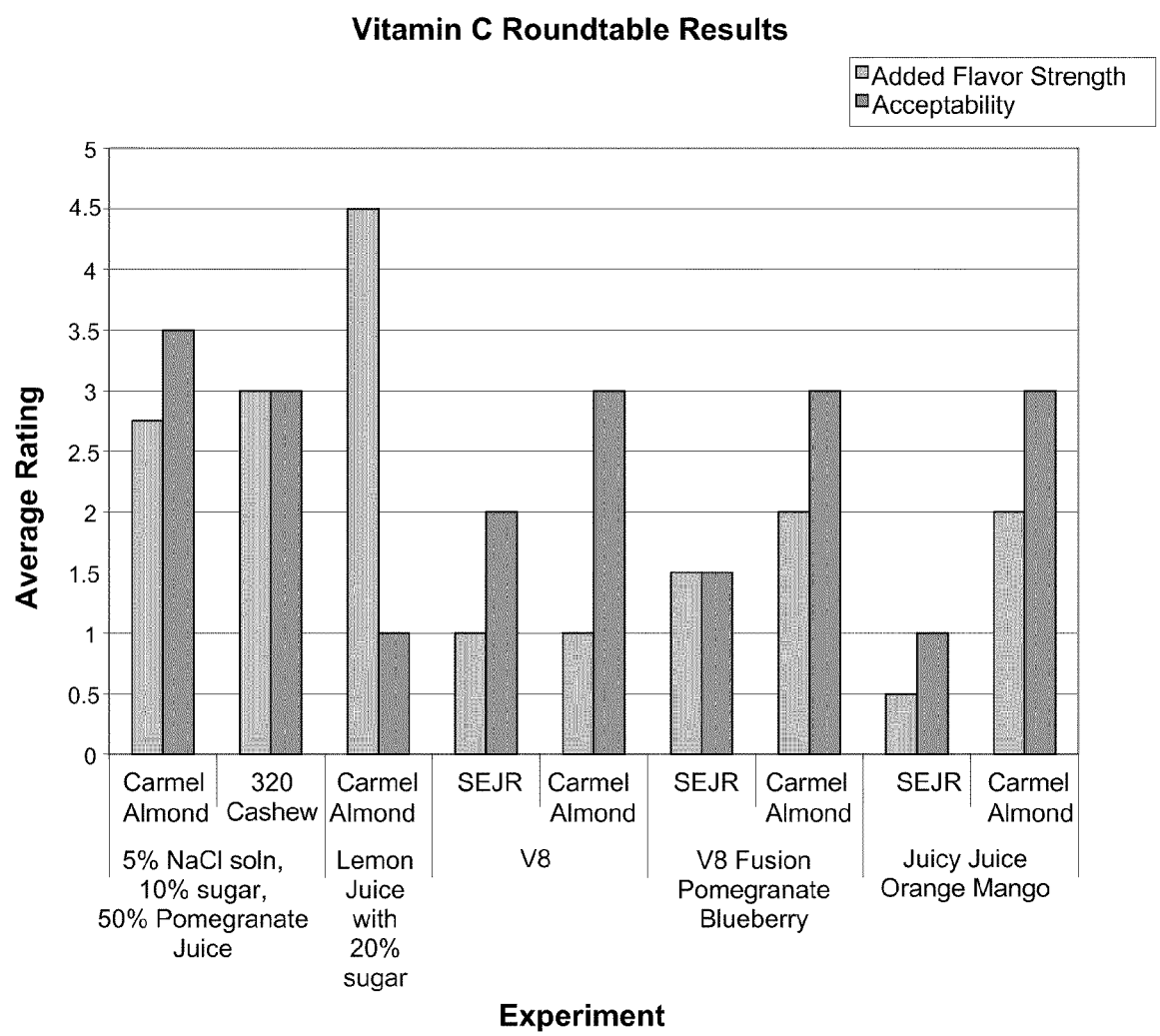

This Example studied the impact of infusion of fruit and vegetable extracts on product flavor and appearance. FIG. 17 shows taste test acceptability ratings where fruit and vegetable concentrates and fresh squeezed lemon juice were used as a pre-roast aqueous infusion fluid. Pomegranate juice infusion adds a distinct flavor to the roasted kernel as well as stimulating browning reactions during roasting and adding a glossy surface coating to the product surface. Lemon juice with about 20% sucrose infusion is a strong flavor modifier because it adds citrus taste components such as acidity, bitterness, sourness, and astringency, but some key lemon flavor components are reduced after kernel roasting and consequently the product is rated a 1 score in product acceptability. Table 6 below shows that the acceptability of the lemon almonds can be improved by post roast application of lemon oil extract at about 0.2% which adds back many of the lemon components lost in the extraction and roasting processes. An alternative method could be to add about 5 to about 20% of a water-soluble lemon flavor or other compatible flavor to the initial aqueous infusion fluid.

TABLE 6

Dry Roasted Almonds Infused with Lemon

| Treatment | | Finished Product Sensory Score, 0 none > 5 high | |
|---|---|---|---|
| Aqueous Infusion | Post Roast | Added Flavor Strength | Acceptability |
| 20% Sucrose in lemon juice | none | 4.5 | 1 |
| 20% Sucrose in lemon juice | 0.2% lemon oil | 3.75 | 2.25 |

Infusions with vegetable juice concentrates (V8) and mixtures of juice and vegetable concentrates were weaker flavor modifiers in the finished product than pomegranate or lemon juice as shown in FIG. 17. These fruit and vegetable extracts also accelerate browning reactions during roasting, presumably by increasing the concentration of Maillard reaction precursors such as reducing sugar and possibly free amino acids. If desired, the rapid browning reactions with infusion fluids rich in sugars can be masked on surface of the finished product by using kernels with brown seed coats such as almonds or hazelnuts.

Aqueous infusion can be used to change the color of the kernel surface with natural pigments. FIG. 17 also shows infusion of the unfiltered V8 vegetable mixture of tomato, carrot, beet, and other carotenoid rich materials into peanut and almond kernels in the form of a colored suspension and emulsion. In another experiment, almond kernels were infused with red pepper and mixture of dried spices, paprika, and red bell pepper. The red peppers (8%) and spice mix (23%) had been ground in a mortar and pestle, extracted with water, and then filtered through a 90 micrometer size screen prior to the infusion process into the kernels. Plant tissue extracts are a good source of carotenoid pigments such as Beta-carotene, a Provitamin A. The 150° F. extraction process described here is good at emulsifying these lipophilic carotenoids and suspended plant particles based on the observed change in yellow/orange color hue in the almond kernel surface. In some cases, the peanut kernel was observed as not a good kernel surface to coat with these particular emulsions or suspensions because the color change associated with carotenoid absorption and the brown pigment formation associated with Maillard reactions resulted in a mottled surface color on the blanched peanut surface. The brown almond seed coat may provide a better background for seeing a uniform yellow/orange hue on the product surface with some infusion solutions.

Example 10

This Example studied an aqueous infusion solution to increase kernel content of reactive flavor precursors. Fluids of pomegranate juice, vegetable extracts, fruit extracts, maple syrup, brown sugar, or Sucrose were studied as examples of infusion treatments that promote Maillard reactions at least in part by increasing sugar concentration. The type and concentration of other reactive precursors in the ingredients used, as well as those found in the nut kernels themselves, are potential factors in the rate of flavor development and color development during roasting.

For example, Table 7 below shows some comparative oil roasting experiments where non-infused peanut kernels grown in different environments have very different rates of roast color and flavor development. Peanuts kernels were oil roasted at about 315° F. for up to about 8 minutes in peanut oil.

The natural sucrose and free amino acid content of kernels were measured using liquid chromatography methods. Surface roast color as CIELAB L* value was measured at timed intervals using a HunterLab instrument. The West Texas kernels had about 5.5% Sucrose and about 0.3% total free amino acid content as compared to the about 3.5% and about 0.2% values, respectively, for Alabama and Georgia kernels.

The rate of roast color development, and related flavor development, is significantly greater in Texas kernels, and correlates with a much greater consumption of free glutamate during roasting than is found in Alabama and Georgia kernels. The much larger sucrose pool in both types of kernels does change during roasting, but while not wishing to be limited by theory, it seems likely that precursors such as free glutamate might be more rate limiting in Maillard reactions during roasting. Furthermore, the flavor development in many finished products infused with aqueous extracts described herein suggest that the soluble reactants in the infusion solutions were influencing flavor development in the total product matrix.

Infusion with soluble peptides in aqueous infusion solutions might be a way to enhance the pool of reactive amino acids. It is expected that soluble soy peptides would be an excellent flavor precursor to combine with the other extract components tested here. To increase available amino acid precursors and other metabolites, it is expected that addition of proteases or mixes of proteases and other relevant enzymes into aqueous infusion solution could be used. The roasting operation would stop enzymatic activity after the potential pools for flavor precursors had increased. The results in Table 7 suggest that a 0.1% increase in total free amino acids might increase the rate of color development and related flavor development in peanut kernels.

TABLE 7

| Peanut Kernel Source | Raw Kernel Free Amino Acids, % as is wt. | Free Glutamate Consumption on Roast, micromoles/ min/100 g dry wt | Roast Color Development, CIELAB L*/min |
|---|---|---|---|
| Texas (n = 6) | 0.315 | $73.5^A \pm 8.2$ | $2.22^A \pm 0.03$ |
| Georgia/Alabama (n = 4) | 0.165 | $42.0^B \pm 5.3$ | $1.50^B \pm 0.19$ |
| t-Test Probability | | 0.0003 | 0.0046 |

Example 11

This Example investigated seed infusions with cocoa, coffee, and green tea. Extracts of cocoa, roasted coffee, and green tea were tested. To help overcome undesired flavors that may be present with these infusion components milk, cream, and sugar were used in the infusion solution to moderate the undesired flavors (i.e., bitterness with caffeine and theobromine and astringency with phenolic compounds). The cocoa, coffee, and green tea extracts are themselves complex mixtures of flavors.

Figure 18:
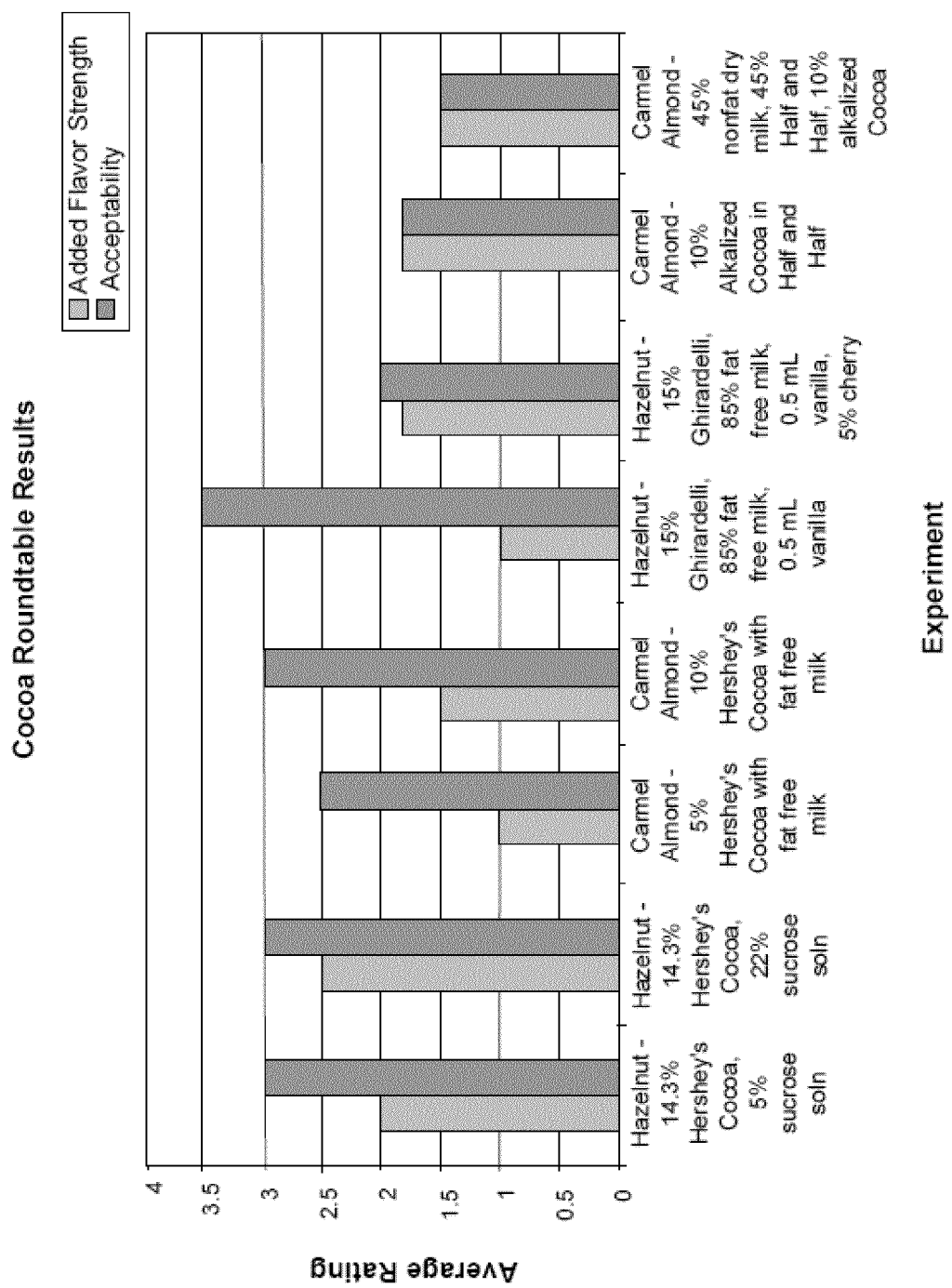

FIG. 18 shows some aqueous infusion experiments where natural cocoa, alkalized cocoa, and a cocoa mix with ground chocolate were infused into seeds using the procedures described herein. Low cocoa or chocolate flavor was observed, but overall acceptability was acceptable, but moderate. Post-roast addition of oil-soluble chocolate flavors at about 0.1% increased chocolate flavor intensity, but overall acceptability was still acceptable, but declined relative because it was believed the post-roast addition resulted in an unbalanced overall flavor and possibly some off flavors.

It is believed that the 10% alkalized cocoa extract in milk may have unique properties for making finished products as compared to other cocoa ingredients. After roasting, the infused kernel with the alkalized cocoa extract in milk had a black coating that uniformly covers the kernel surface and adheres very tightly during handling. While not wishing to be limited by theory, it seems likely that this very beneficial coating performance is due to some property of the alkalized cocoa because native cocoa extracts do not bind as tightly to the kernel surface. Again while not wishing to be limited by theory, some possible factors might be particle size (>94% smaller than 75 micrometers), or that cocoa storage proteins and carbohydrates are modified during the alkalization and roasting process such that natural adhesives are formed that facilitate binding to kernel surfaces.

Figure 19:
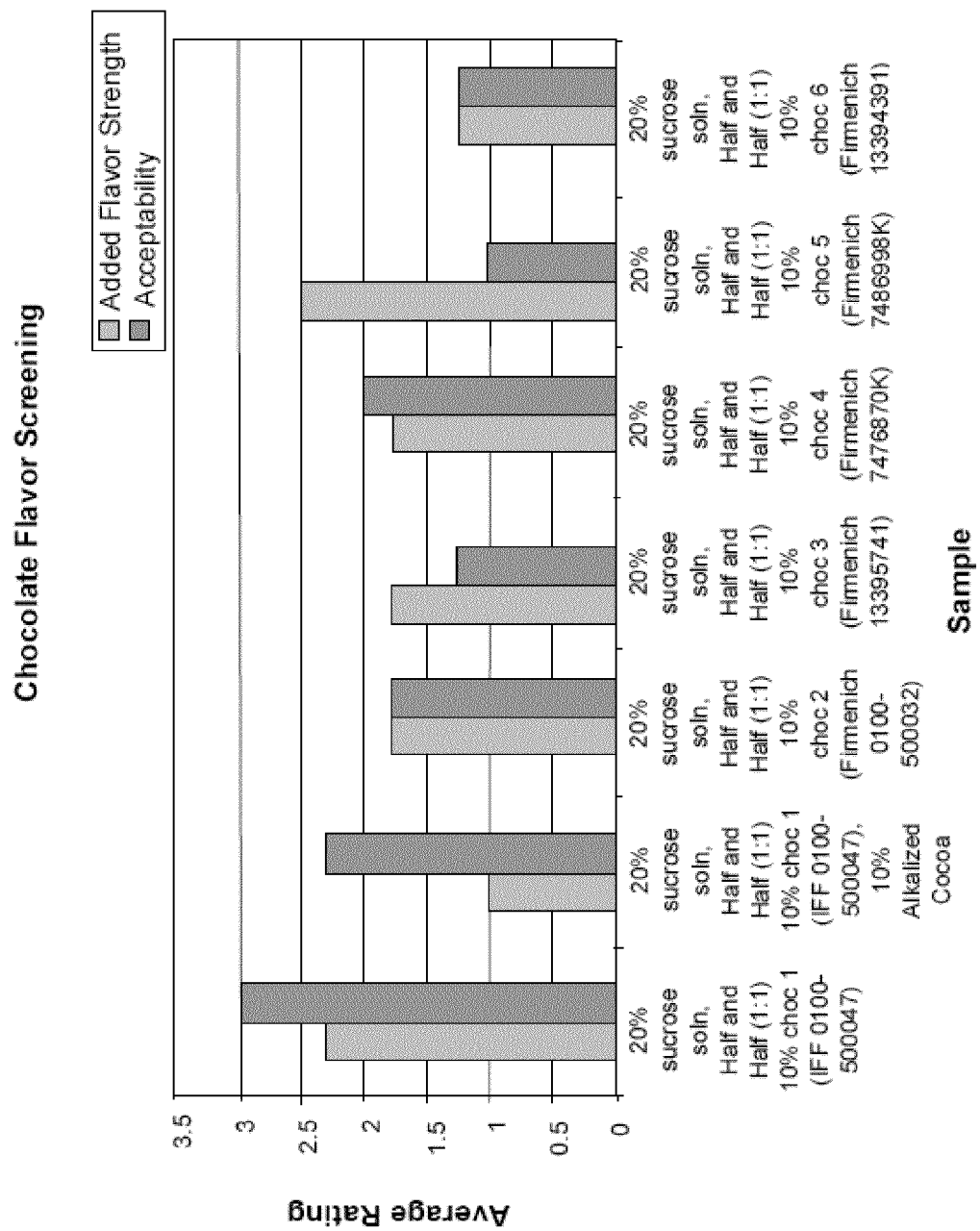

Commercial chocolate flavors designed for water solubility were tested at 10% in sucrose and milk solutions as shown in FIG. 19 using almond kernels. While these infusions resulted in acceptable product, this test demonstrated that many of these added chocolate flavors added only little flavor to the finished product. The almond sample with added chocolate flavor and 10% alkalized cocoa had similar flavor ratings as the cocoa only test shown in FIG. 18. Nonetheless, some chocolate flavors were given overall positive ratings in the roasted kernel matrix. The added chocolate flavor would be approximately 0.5% of the finished product weight in these experiments. It is believed that a 20% infusion solution of chocolate flavor would bring the final chocolate flavor concentration to a better range of 1-2% of the finished product weight.

Figure 20:
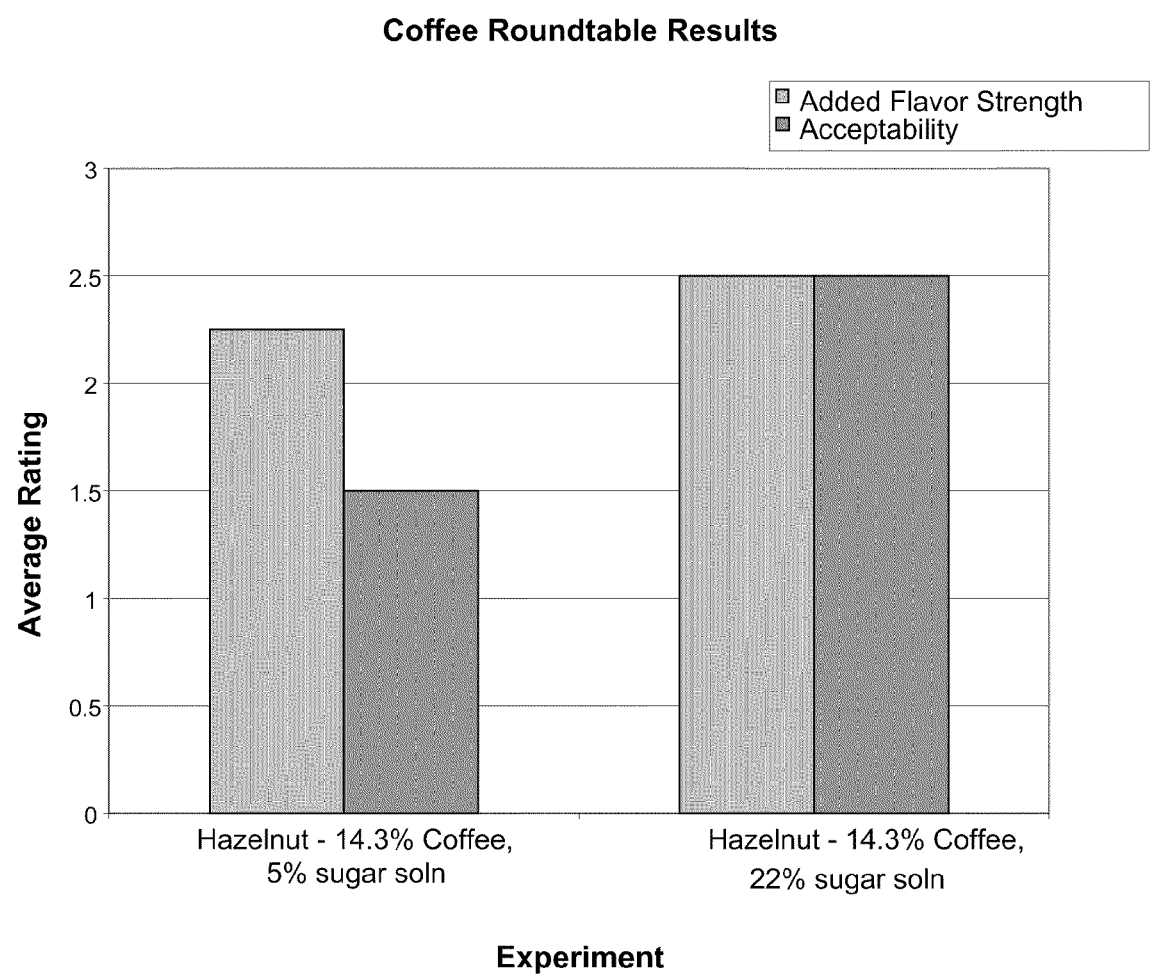

Aqueous-infused hazelnut kernels had acceptable overall taste and flavor for natural cocoa (FIG. 18), and for roasted coffee if additional sucrose was added to the extract (FIG. 20). The taste and flavor of roasted coffee infusions can be difficult to balance in the finished product profile because of high levels of bitterness and astringency, and relatively low coffee flavor impact. It is believed that hazelnut kernels may have the most promise with coffee infusion, but the formulation may need a modifier such as added milk along with added sugar.

Figure 21:
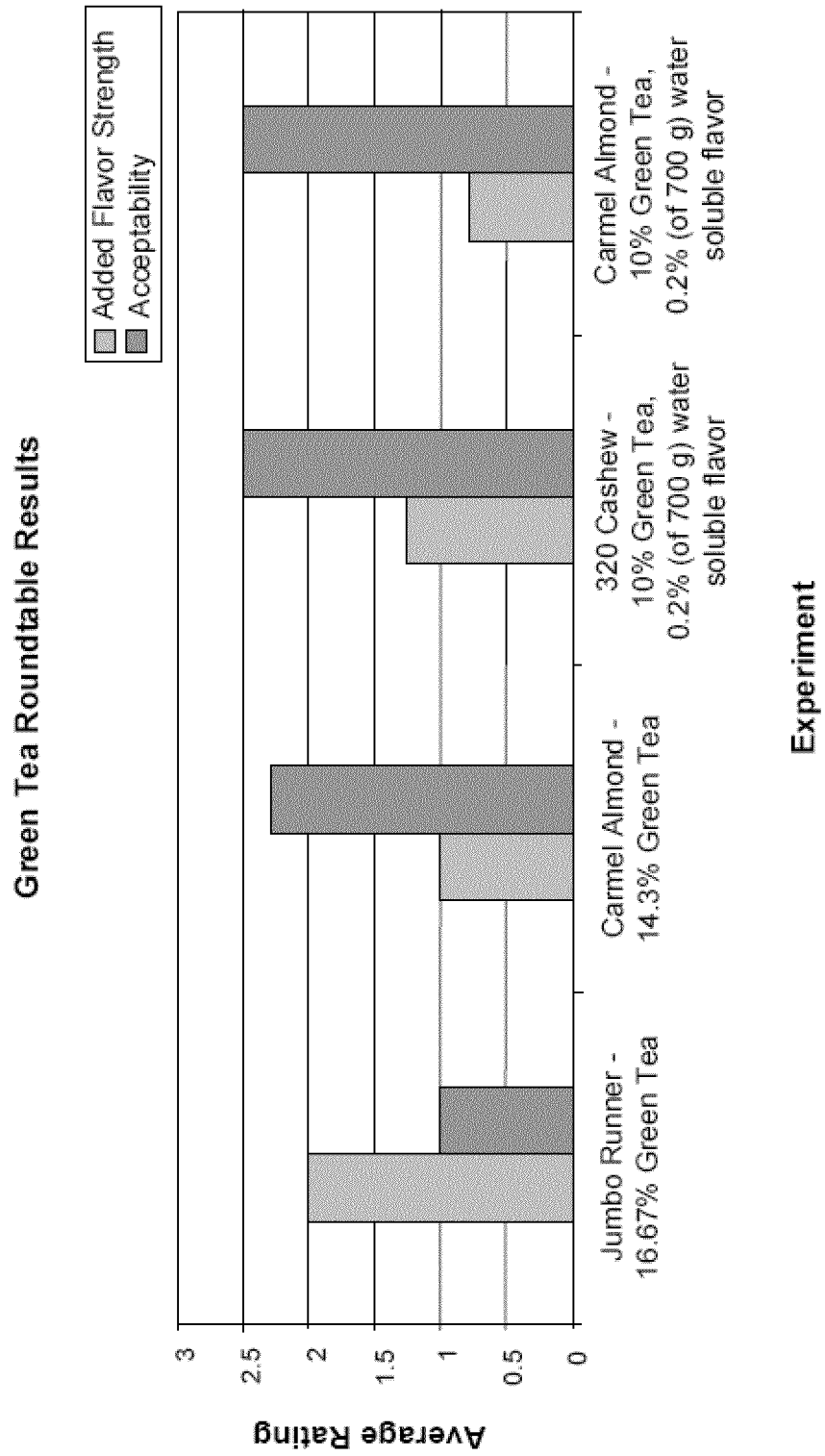

Green tea infusion produced an acceptable product, but was not a very strong added flavor with a 10% extract (FIG. 21). The infused seed exhibited astringency and some bitterness. A commercial green tea flavor added at 2% to the extract solution appeared to improve the green tea flavor but had little impact on overall flavor strength. The overall acceptability and flavor strength of the finished product was improved by adding post roast additions of ginger, lemon, cilantro lime, or Jalapeno oil extracts at about 0.1 to about 0.2% of the finished product weight.

Example 12

Figure 22:
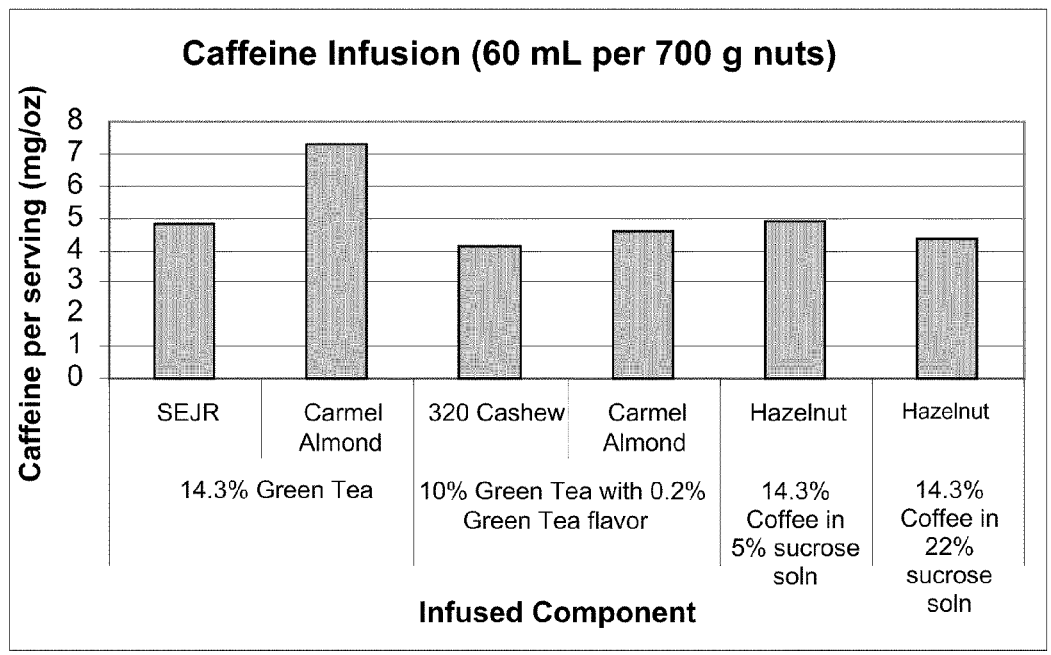
FIGS. 22 and 23 are graphs of caffeine and theobromine content.
Figure 23:
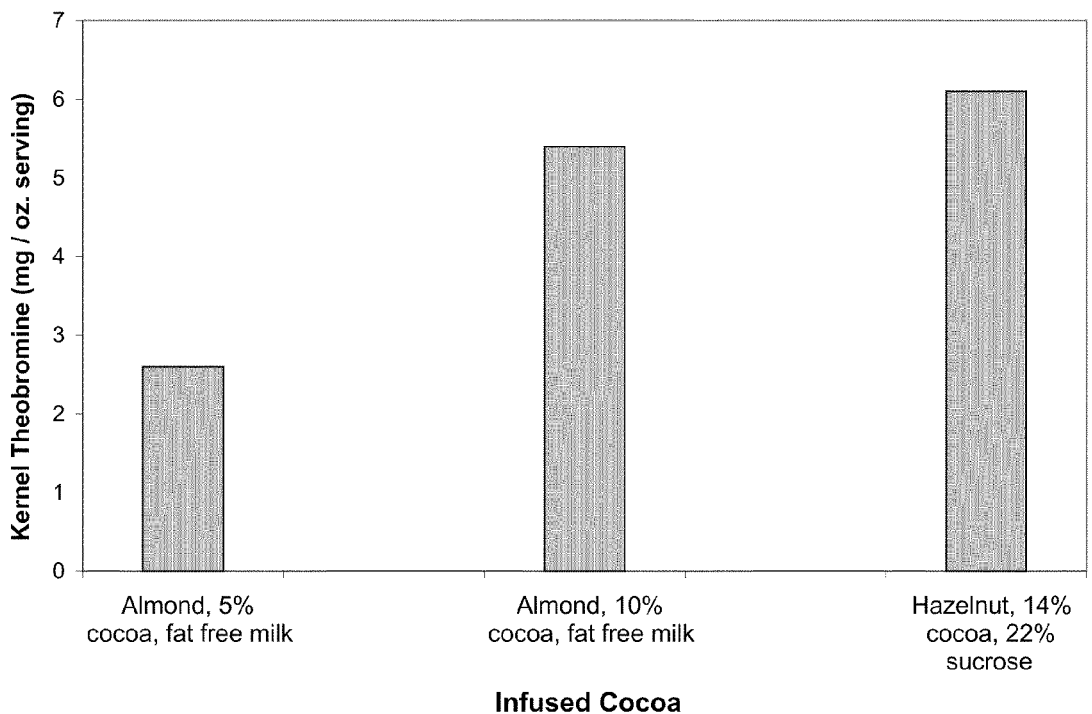

This Example studied the effects of caffeine and theobromine infusions into seeds using aqueous extracts of cocoa, coffee, and green Tea. Both Caffeine and Theobromine are readily extracted out of the dry commodity in the 150° F. fluid extraction, and survive all the processing steps, such that the finished product contains most of the methyl xanthines initially measured in the plant tissues. An average of 80% of the caffeine in green tea was extracted and infused into kernels in four experiments, whereas an average of 104% of the caffeine in Starbuck's coffee was transferred into kernels in two experiments. The amount of Caffeine per ounce or about 28 g for some green tea and coffee infusions is shown in FIG. 22 and ranges from about 4 to about 7 mg during a 10 minute infusion process. FIG. 23 shows that finished products made with aqueous infusions solutions having about 10 to about 14% cocoa extracts have about 5 to 6 mg theobromine per about 28 g, which is similar to the amount of caffeine extracted from about 10 to about 14% green tea experiments shown in FIG. 21. Lower amounts of theobromine are found in the finished product if the cocoa extract is more dilute.

Example 13

This Example measured phenolic compounds and antioxidant activity in kernels infused with antioxidant rich plant extracts. One benefit of having both an initial aqueous infusion process and a post-roast oil based infusion process is to be able to enrich roasted snack kernels with bioactive compounds such antioxidants which have both hydrophilic and lipophilic solubility properties. It is believed that there are beneficial interactions between antioxidants in both the aqueous phase and the oil phase in foods with high oil content like roasted snack kernels which help stabilize the finished product.

Huang et al., J. Agric. Food Chem. 2005. 53:1841-1856 describe how the Oxygen Radical Absorbance Capacity (ORAC) assay is widely used as a general assay to measure the capacity of an extract to quench destructive free radicals in the food matrix. The extraction solvents in the ORAC assay can be adjusted to estimate antioxidant activity in both hydrophilic and lipophilic phases in the test material. Total phenolic content is estimated as ferulic acid equivalents based on the phenol reagent test. The amount of the individual catechins in green tea-infused kernels was measured using a liquid chromatography method.

Figure 24:
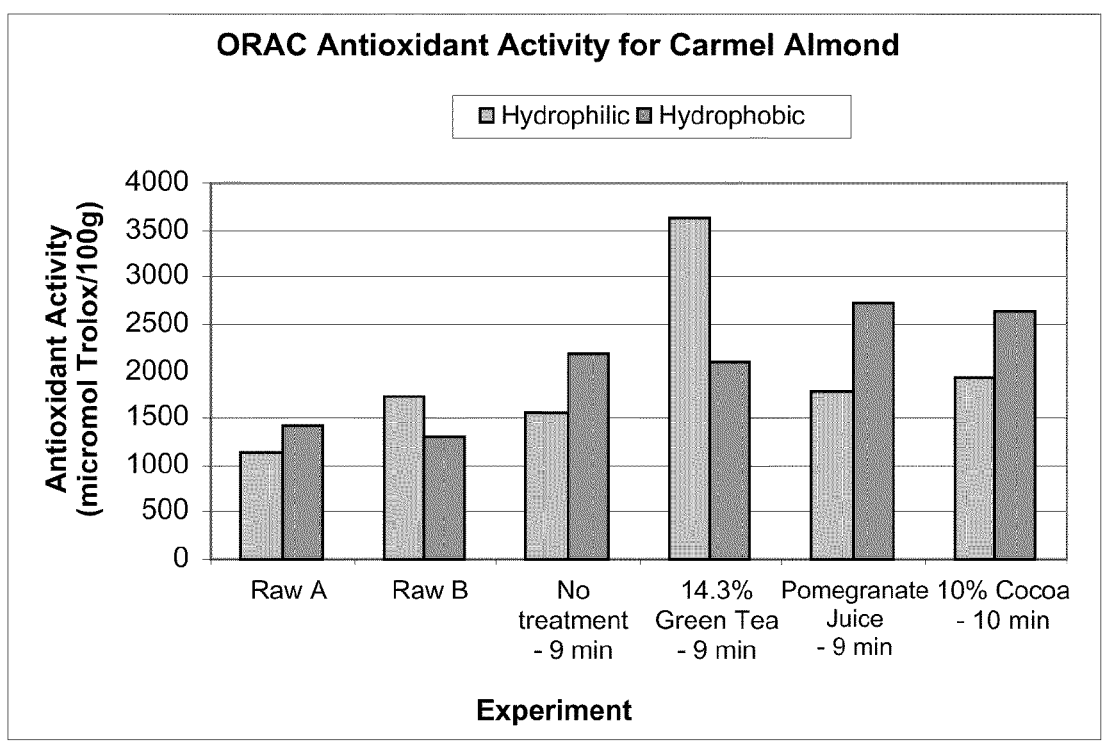
FIG. 24 is a graph of antioxidant activity.

FIG. 24 shows the ORAC antioxidant activity in raw and roasted almond kernels infused with green teas, pomegranate juice and cocoa as compared to raw seeds and roasted seeds with no aqueous infusion for both the hydrophilic extract and the lipophilic extract. A comparison of the ORAC activity of raw kernels and roasted kernels with no infusion treatment suggests that there is a little increase in kernel ORAC antioxidant activity in the oil phase after roasting. Ingredients such as green tea, pomegranate and cocoa contain significant antioxidant activity. Green tea-infused almonds had significantly more ORAC antioxidant activity in the hydrophilic phase as shown in FIG. 24. The infusions with pomegranate and cocoa into almonds were associated with slight increases in lipophilic ORAC activity.

The association between total phenolic compound content and antioxidant activity in a tissue is usually a positive correlation because specific phenolic species are known to act as antioxidants in vitro. Table 8 below shows an experiment where raw peanut kernels and almond kernels were soaked in excess volumes of green tea extract and then dry roasted prior to catechin analysis. The amount of caffeine infused into the kernels in this soaking infusion process was similar to the 4-7 mg concentration shown in FIG. 22 for the continuous coating process used in most experiments. The total catechin concentration in the infused almond kernels and peanut kernels was roughly double that of caffeine. Table 8 shows that raw kernels have very little total catechins and that the concentration of these known antioxidants increases approximately 100-fold after soaking infusion with green tea. Table 9 shows that the soaking infusion with green tea increases the total phenols content of kernels by 30% and 50%, respectively, for almond and peanut, if the amount of infused catechins is added to the amount of total phenols measured in raw kernels. Furthermore the enhanced ORAC antioxidant activity in green tea-infused almonds suggests that infused phenolic compounds may be functional in the food matrix.

TABLE 8

| Compound | Almonds | | Peanuts | |
|---|---|---|---|---|
| | uncooked, µg/g | infuse/DR, µg/g | uncooked, µg/g | infuse/DR, µg/g |
| Caffeine | 0 | 244 | 0 | 132 |
| Catechin | 3.5 | 9 | 4.86 | 9.35 |
| Epicatechin | 1.17 | 32.5 | 1.04 | 29.9 |
| Gallocatechin | 0 | 24.2 | 0 | 33 |
| Epigallocatechin | 0 | 161 | 0 | 127 |
| Catechin Gallate | 0 | 2.69 | 0 | 3.15 |
| Epicatechin Gallate | 0 | 38.7 | 0 | 39.1 |
| Gallocatechin Gallate | 0 | 18.4 | 0 | 24 |
| Epigallocatechin Gallate | 0 | 152 | 0 | 148 |
| Total Catechins | 4.67 | 438 | 5.9 | 413 |

TABLE 9

Impact of Green Tea Infusion on Peanut & Almond Phenols

| Kernel Type | Raw Kernels | | Green Tea Infused Roasted Kernels |
|---|---|---|---|
| | Total Phenols, mg/100 g | Total Catechins, mg/100 g | Total Catechins, mg/100 g |
| Peanuts | 133 | 0.6 | 41 |
| Almonds | 88 | 0.5 | 44 |

Example 14

A sea salt and olive oil nut was prepared. First, a brine solution with a concentration of about 10% (1 part Cargill sea salt #7585 to 9 parts water) was applied at about 7% of nut weight. All of the brine was applied at the beginning of the drum and tumbled with blanched mission almonds for 5 minutes. The nuts were then oil roasted in cottonseed oil for about 5 minutes at about 295° F. After roasting, the nuts were cooled to below about 120° F. and a blend of 90% peanut oil and 10% olive oil was applied at 2% of the nut weight along with sea salt at 0.8% of the nut weight. The nuts were then packed into bags. In another example, sea salt was applied post roast at about 1.2 percent of the nut weight.

Example 15

A lime and salt nut was prepared. First, a brine solution with a concentration of 10% (1 part Cargill sea salt #7585 to 9 parts water) was applied at 7% of nut weight. All of the brine applied at the beginning of the drum and tumbled with blanched mission almonds for 5 minutes. The nuts were then oil roasted in cottonseed oil for about 5 minutes at 295° F. After roasting, the nuts were cooled to below about 120° F. and a flavored oil comprised of about 88% peanut oil, 9% olive oil, and 1.5% Kalsec oil of lime #48-50 was applied at 2% of the nut weight along with additional lime and salt seasoning (McCormick) at 2% of the nut weight. The nuts were then packed into bags.

Example 16

A chili lime nut was prepared according to the following procedure. A brine solution with a concentration of 10% (1 part Cargill sea salt #7585 to 9 parts water) was applied at 7% of nut weight. All of the brine was applied at the beginning of the drum and tumbled with blanched mission almonds for 5 minutes. The nuts were then oil roasted in cottonseed oil for 5 minutes at 295° F. After roasting, the nuts were cooled to below 120° F. and a flavored oil comprised of 88.65% peanut oil, 9.85% olive oil, and 1.5% oil of lime (Kalsec) was applied at 2% of the nut weight along with chili lime seasoning (McCormick) at 2.6% of the nut weight. The nuts were then packed into bags.

Example 17

A cracked pepper with onion and garlic nut was prepared. First, a brine solution with a concentration of 10% (1 part Cargill sea salt #7585 to 9 parts water) was applied at 7% of nut weight. All of the brine was applied at the beginning of the drum and tumbled with blanched mission almonds for 5 minutes. The nuts were then oil roasted in cottonseed oil for 5 minutes at 295° F. After roasting, the nuts were cooled to below 120° F. and a flavored oil comprised of 89.4% peanut oil, 9.95% olive oil, and 0.65% black pepper (Kalsec) was applied at 2.5% of the nut weight along with steakhouse seasoning (McCormick) at 2% of the nut weight and sea salt (Morton) at 0.5% of the nut weight. The nuts were then packed into bags.

Example 18

Another cracked pepper with onion and garlic nut was prepared A brine solution concentration of 10% (1 part Cargill sea salt #7585 to 9 parts water) was applied at 7% of nut weight. All of brine was applied at the beginning of the drum and tumbled with blanched mission almonds for 5 minutes. The nuts were then oil roasted in cottonseed oil for 5 minutes at 295° F. After roasting, the nuts were cooled to below 120° F. and a flavored oil comprised of about 89% peanut oil, about 10% olive oil, about 0.3% white pepper (Kalsec), and 0.3% black pepper (Kalsec) was applied at about 2.5% of the nut weight along with steakhouse seasoning (McCormick) at 2% of the nut weight and sea salt (Morton) at 0.5% of the nut weight. The nuts were then packed into bags.

Example 19

Experiments were conducted to investigate that infused ingredients could become chemical precursors for roast color and reaction flavor development using the roaster heat and natural constituents in the snack nuts. The infusion and roasting process created reaction products and compounds that did not exist in the starting infusion solution or seed. This reaction development of flavors and colors was measured by sensory assessment of flavor profiles, physical measurement of surface color changes, and analytical measurements of pyrazine content for roasted nut flavor.

Figure 25:
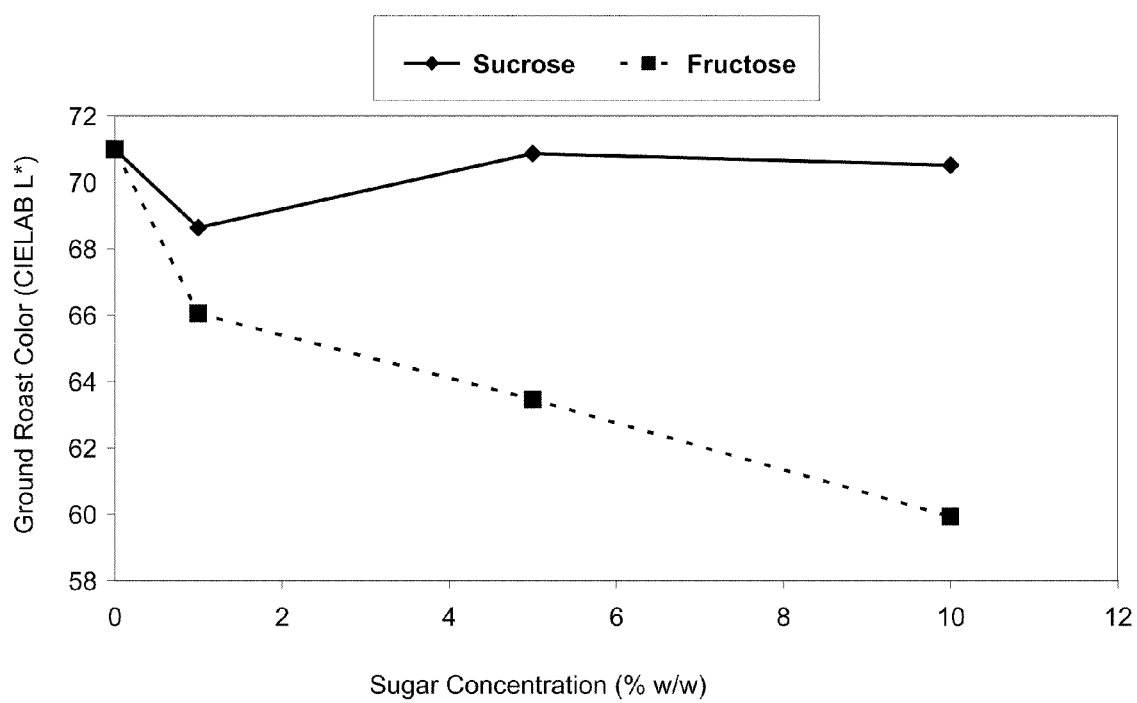
FIGS. 25 and 27 are graphs of roast color development.
Figure 26:
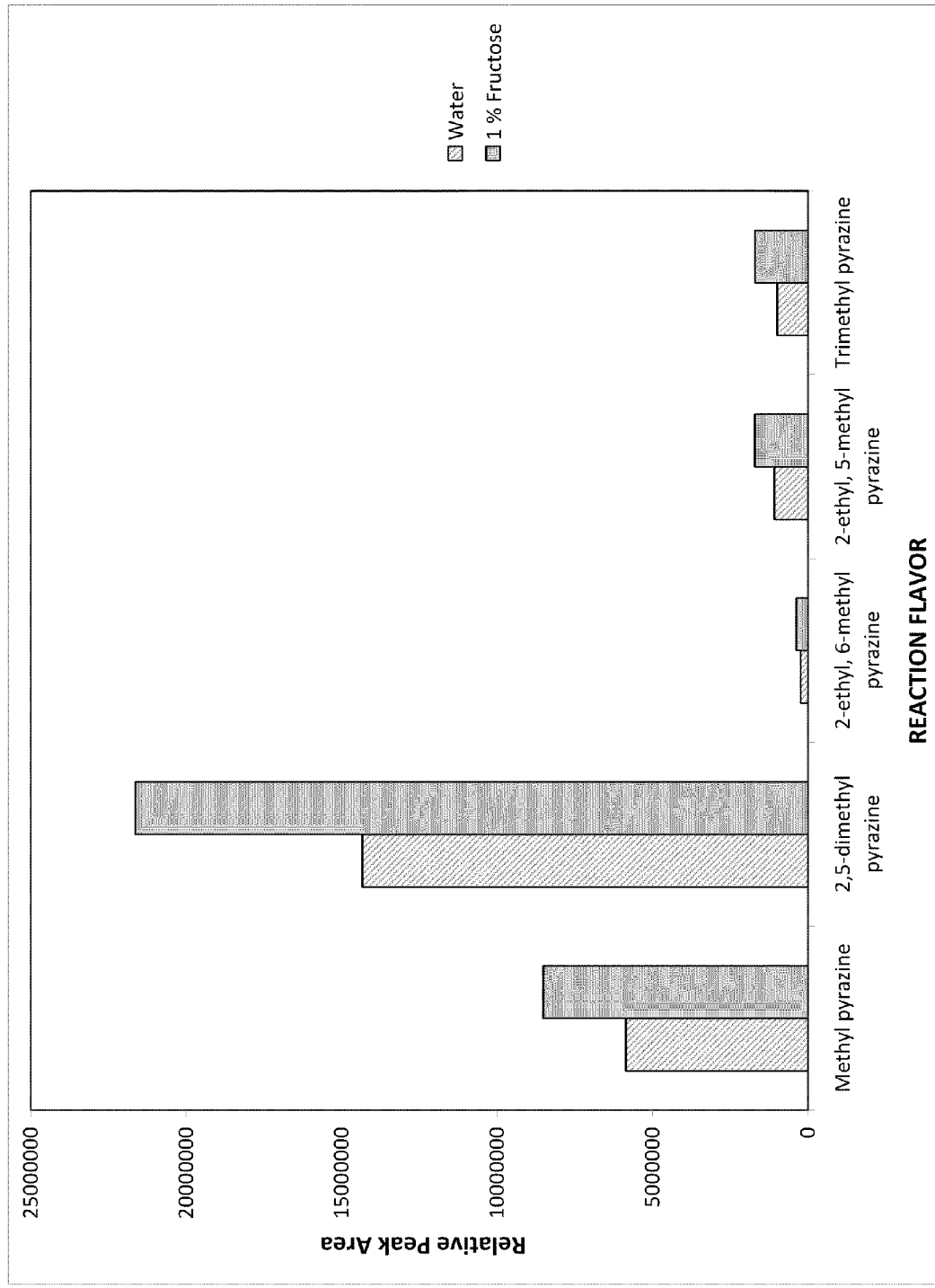
FIGS. 26 and 28 are graphs of roast flavor development.

The formation of roast color is measured by a decrease in the CIELAB L* value using a Hunter colorimeter. Experiments with infused sugars demonstrated the effectiveness of fructose at accelerating roast color formation and the generation of more roast flavor measured as increased pyrazine content. Fruit and vegetable extracts as infusion solutions were effective at changing snack nut color due to both pigment content and the presence of reactive sugars, free amino acids, and peptides that function as precursors for roast color formation by stimulating the synthesis of complex melanodin compounds. FIG. 25 shows the results of experiments demonstrating how pre-roast sugar infusions in peanuts according to the methods herein resulted in reactive color development as compared to a control (0% sugar infusion). FIG. 26 shows the results of reactive flavor development by pre-roast infusion of a 1% fructose solution in peanuts due to the increases in pyrazine relative to a control water infusion nut.

Figure 27:
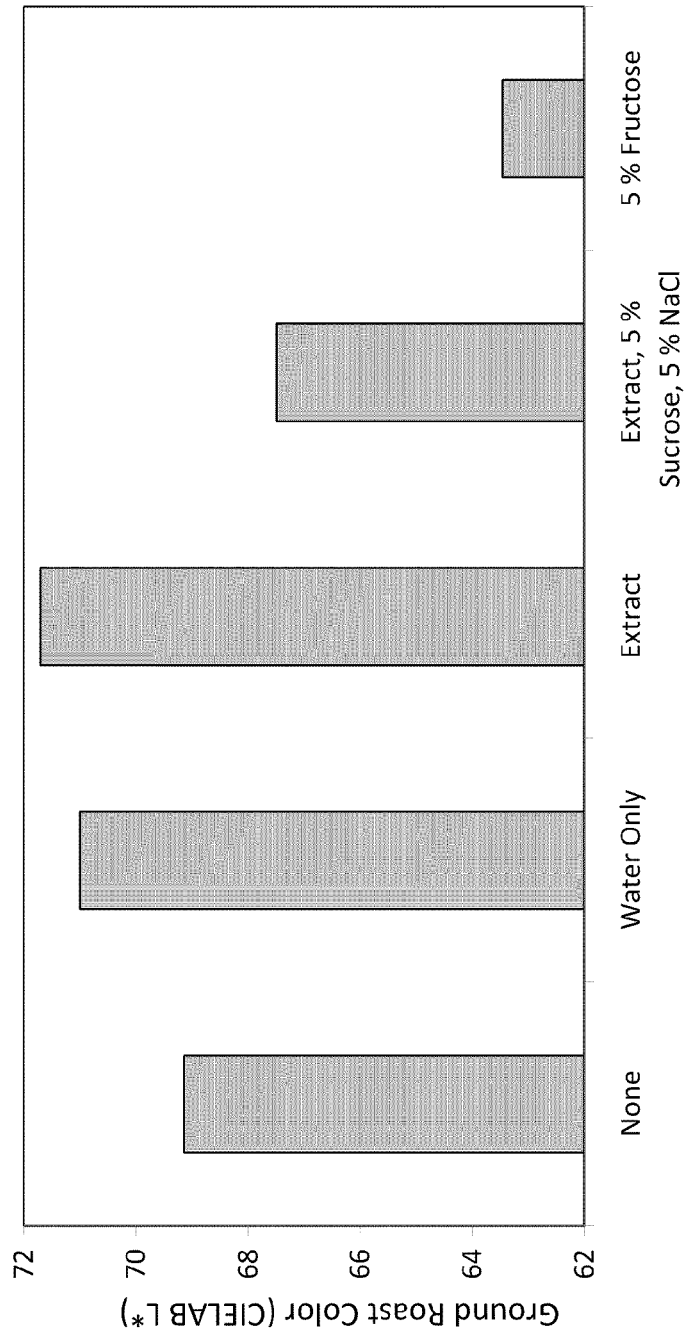
Figure 28:
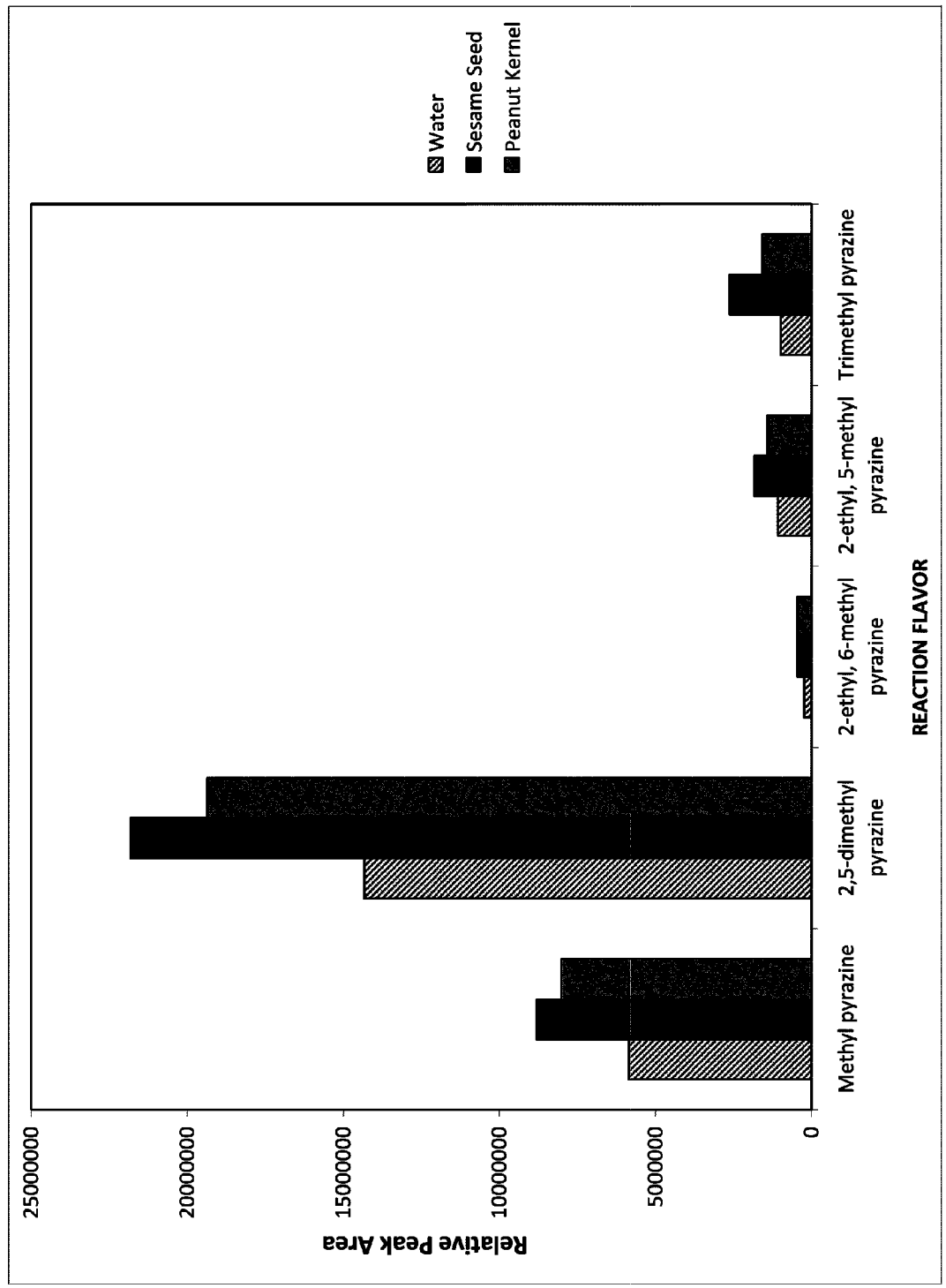

FIGS. 27 and 28 demonstrate the reactive color development and reactive flavor development of pre-roast infusion of peanut or sesame seed extract into whole blanched peanuts. To form the aqueous infusion solution, blanched southeast jumbo runner peanuts were ground and then crushed with a mortar and pestle. These crushed peanuts were then extracted in about 150° F. water for about 10 minutes to form a 20% (w/w) suspension. The resulting extract solution was clarified by filtration through a coffee filter to produce an extract. The extract was then infused into peanuts by applying about 55 ml per about 700 grams of whole blanched peanuts. The infused peanuts were then dry roasted at about 320° F. for about 12 minutes to form a product with a final moisture content of about 1.5%. Another solution was prepared by combining the extract with sucrose and salt. Results of the reactive color development are shown in FIG. 27, and results of the reactive flavor development are shown in FIG. 28. Table 10 below shows acceptability of flavors. While not wishing to be limited by theory, it is believed that the addition of salt to the peanut extract infusion solution improves reactive color and flavor development because the salt may increase the solubility of peanut proteins, which may be due to a greater concentration of reactive amino acids as compared to the peanut extract solution with only water.

TABLE 10

| Peanut Extraction Solution | Infused Finished Product | | |
|---|---|---|---|
| | Moisture, % | Taste Attribute, 0-3 Scale | |
| | | Roasted Peanut | Dark Roast |
| Warm Water Only | 1.96 | 1.5 | 1.5 |
| Warm Water with 5% NaCl & 5% Sucrose | 1.99 | 2.25 | 2.5 |

Example 20

Stereo microscopy and x-ray microanalysis on sodium salt infused almonds was conducted to determine the extent of salt infusion. In this study Mission almonds and Carmel almonds were infused with a 10 percent brine solution (1 part Cargill sea salt and 9 parts water) for 5 minutes. The infused almonds had about a 5 weight percent uptake of the solution.

Figure 29A:
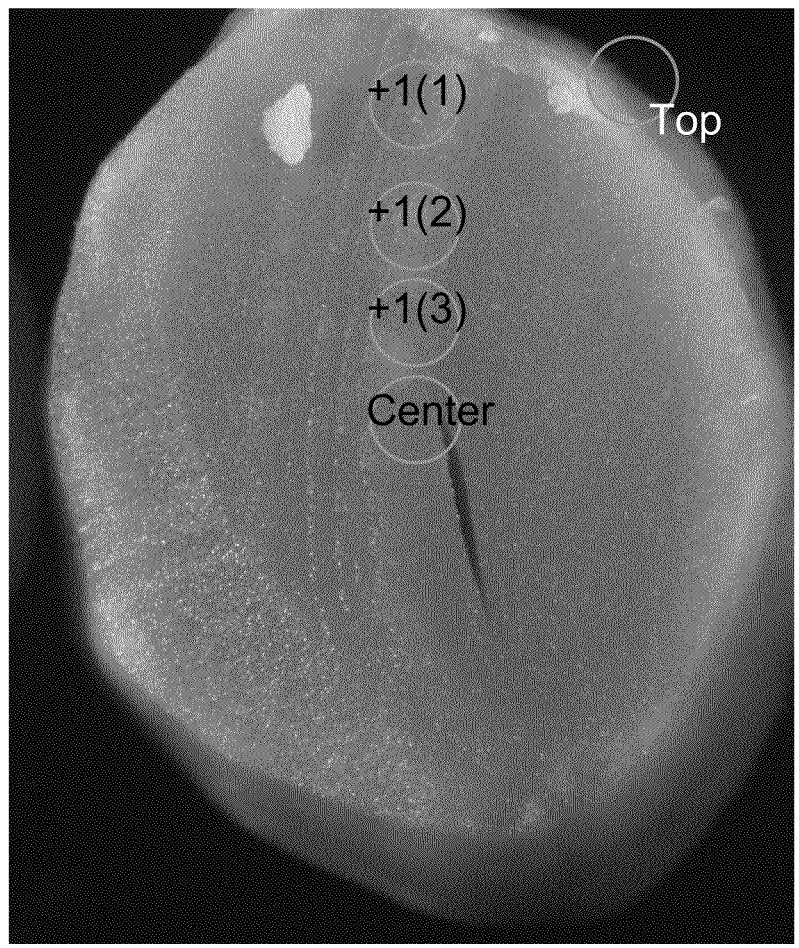
Figure 29B:
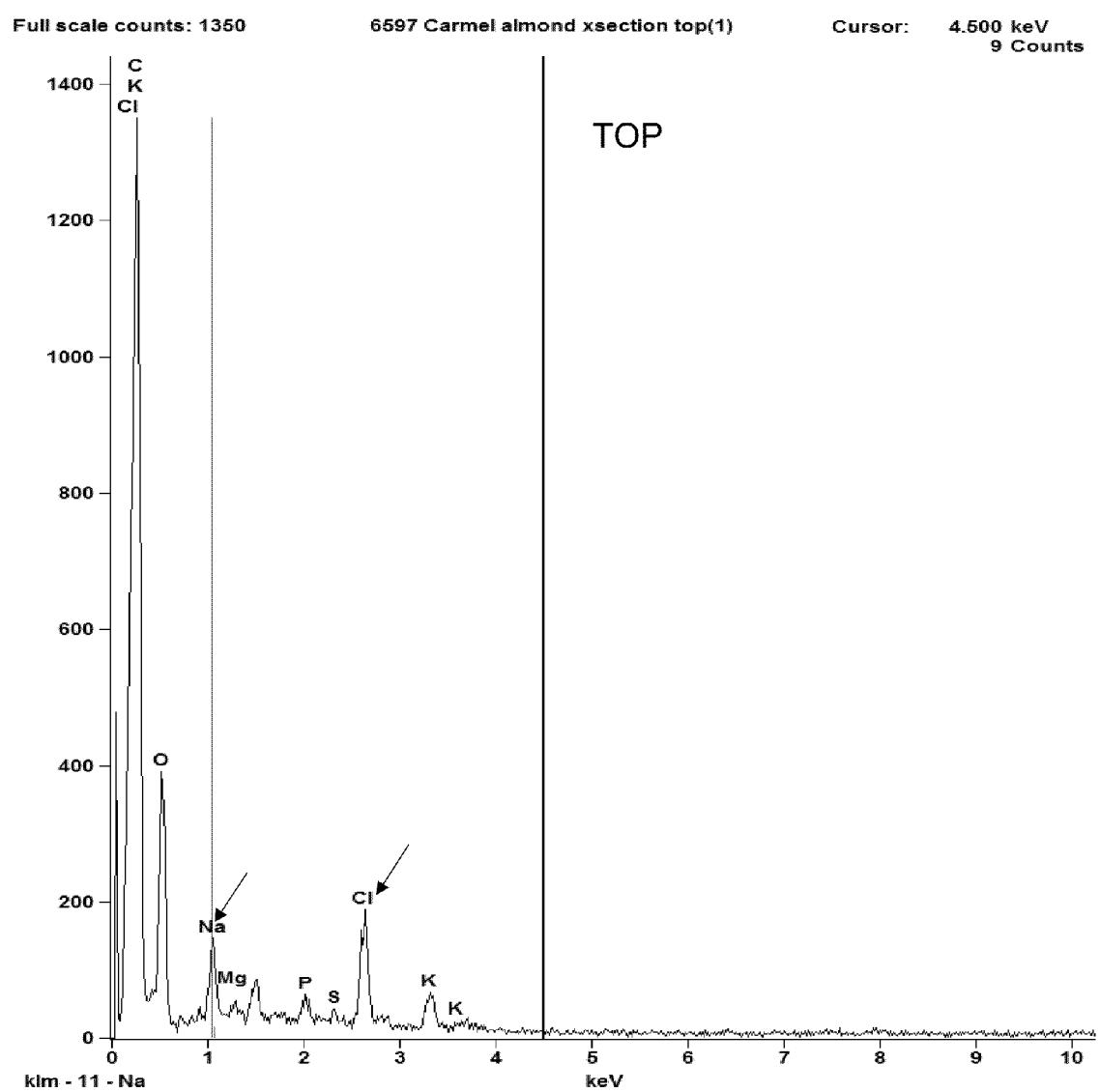
Figure 29C:
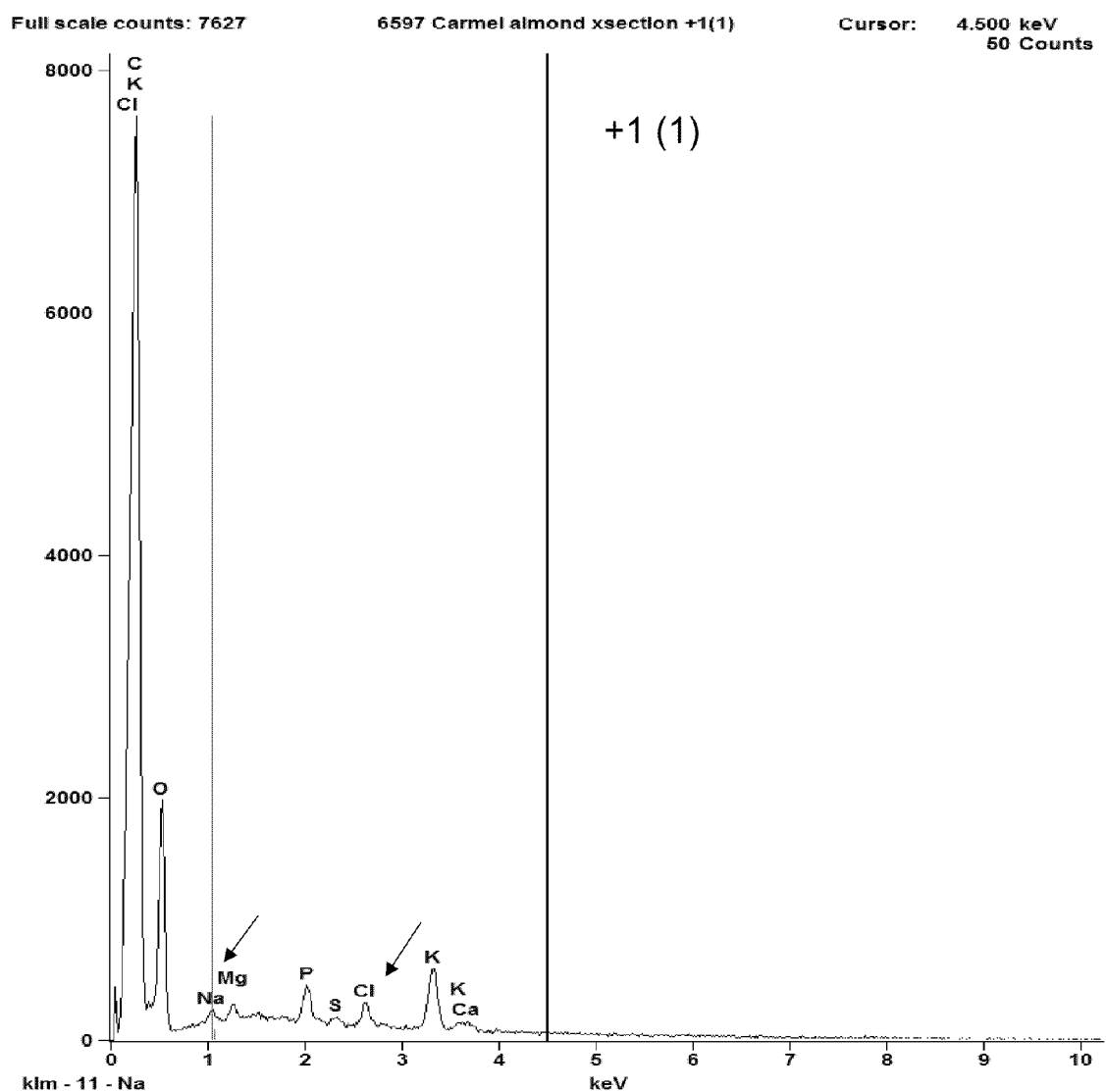
Figure 29D:
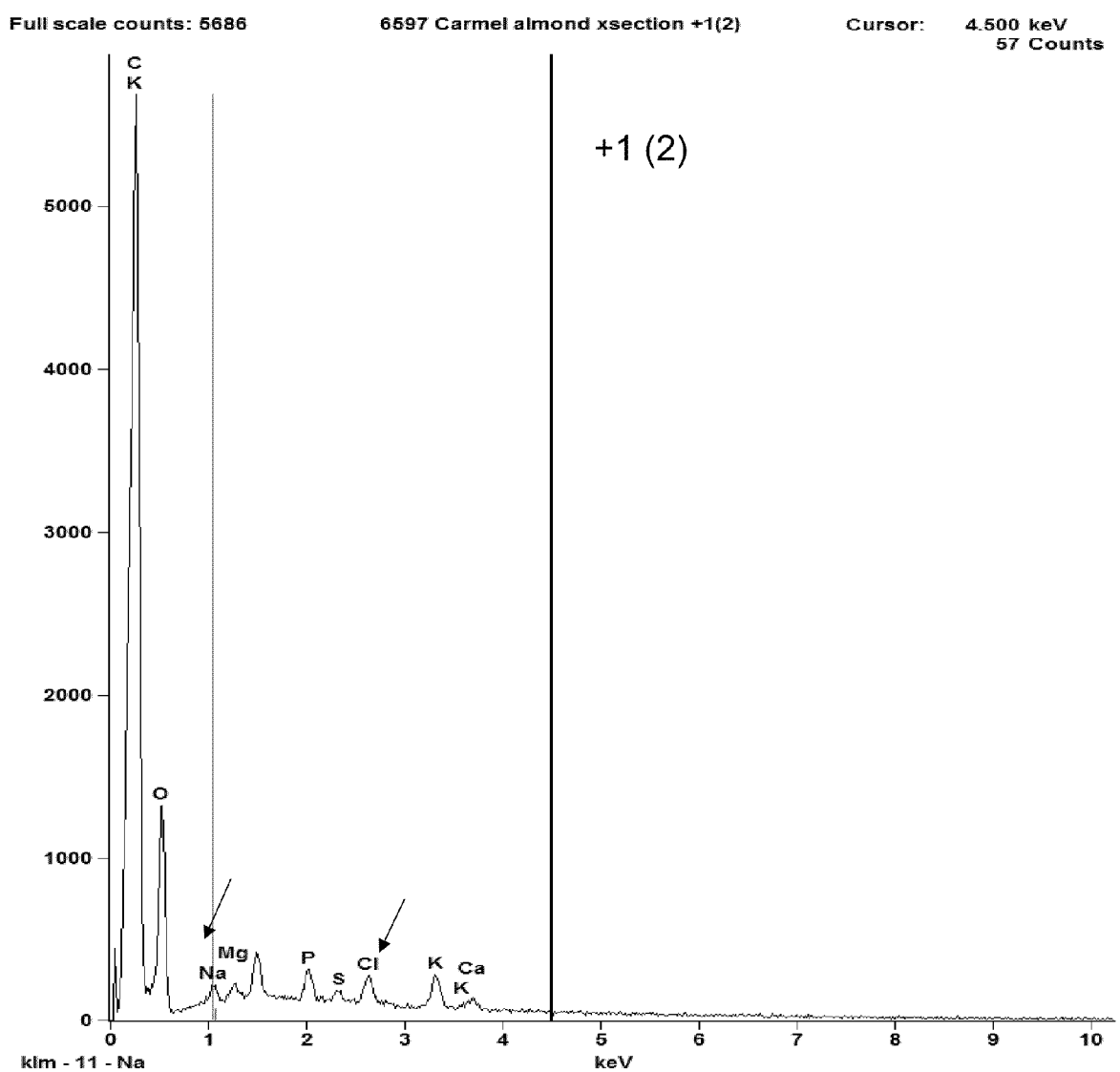
Figure 29E:
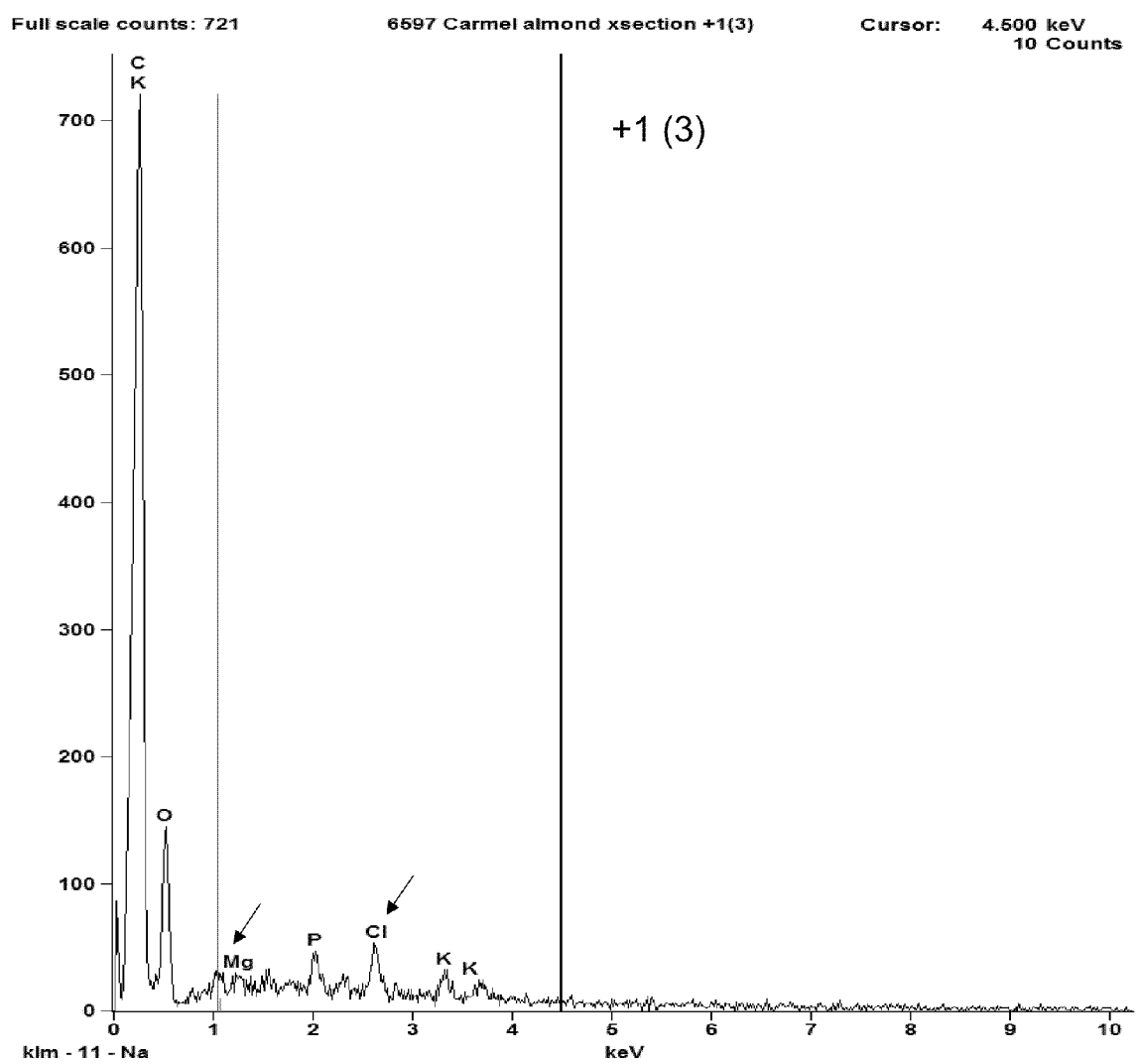
Figure 29F:
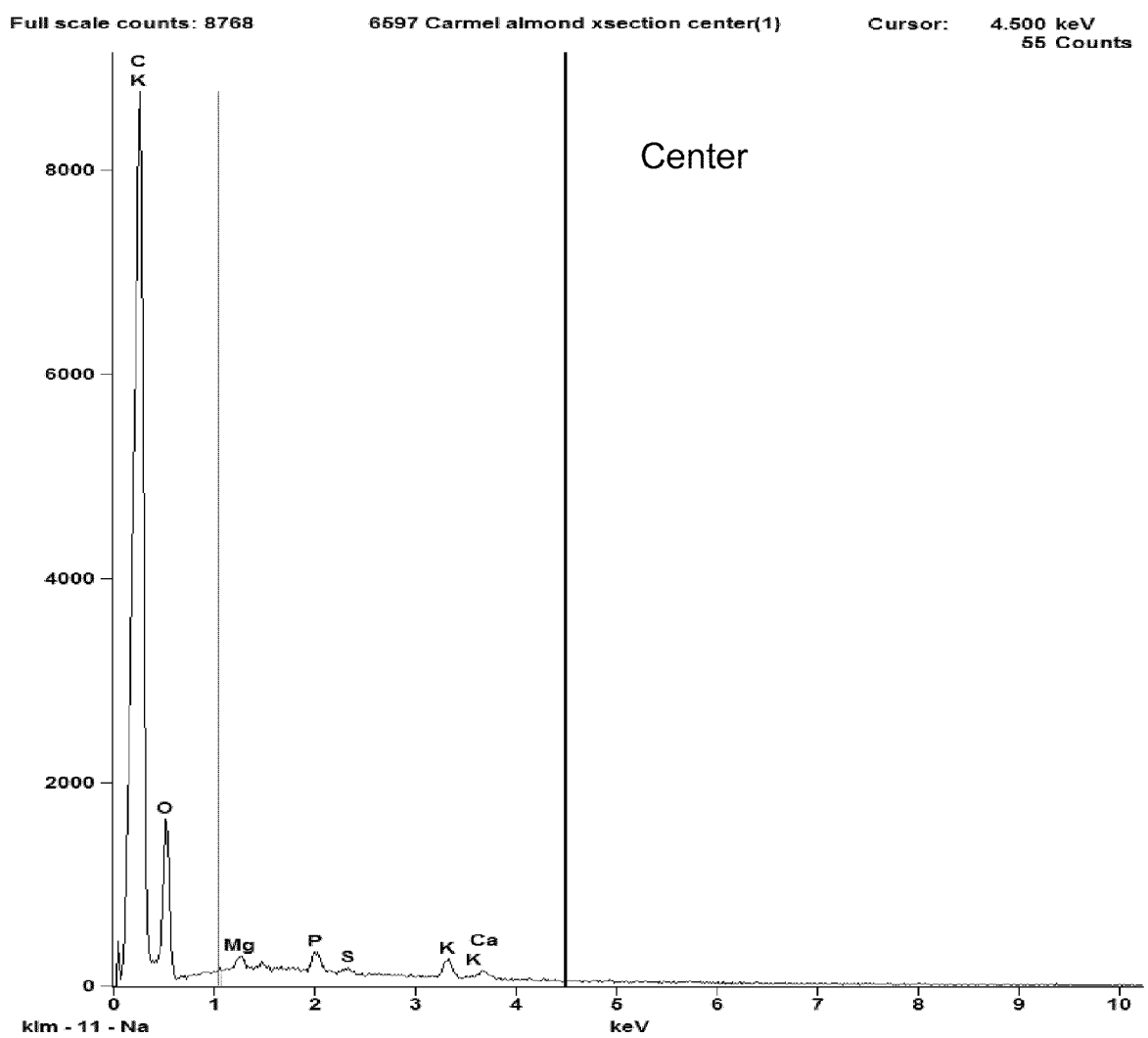
Figure 30A:
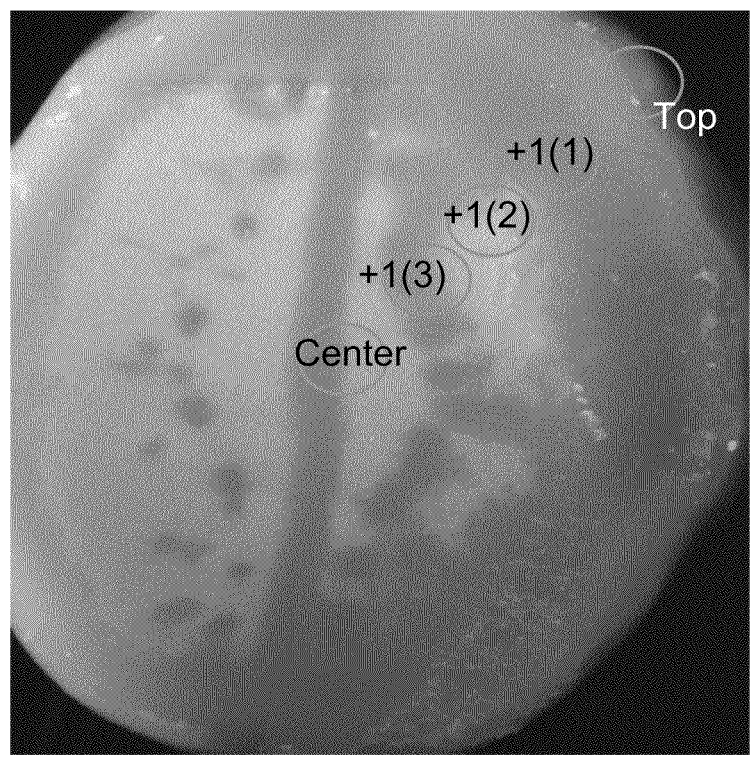
Figure 30B:
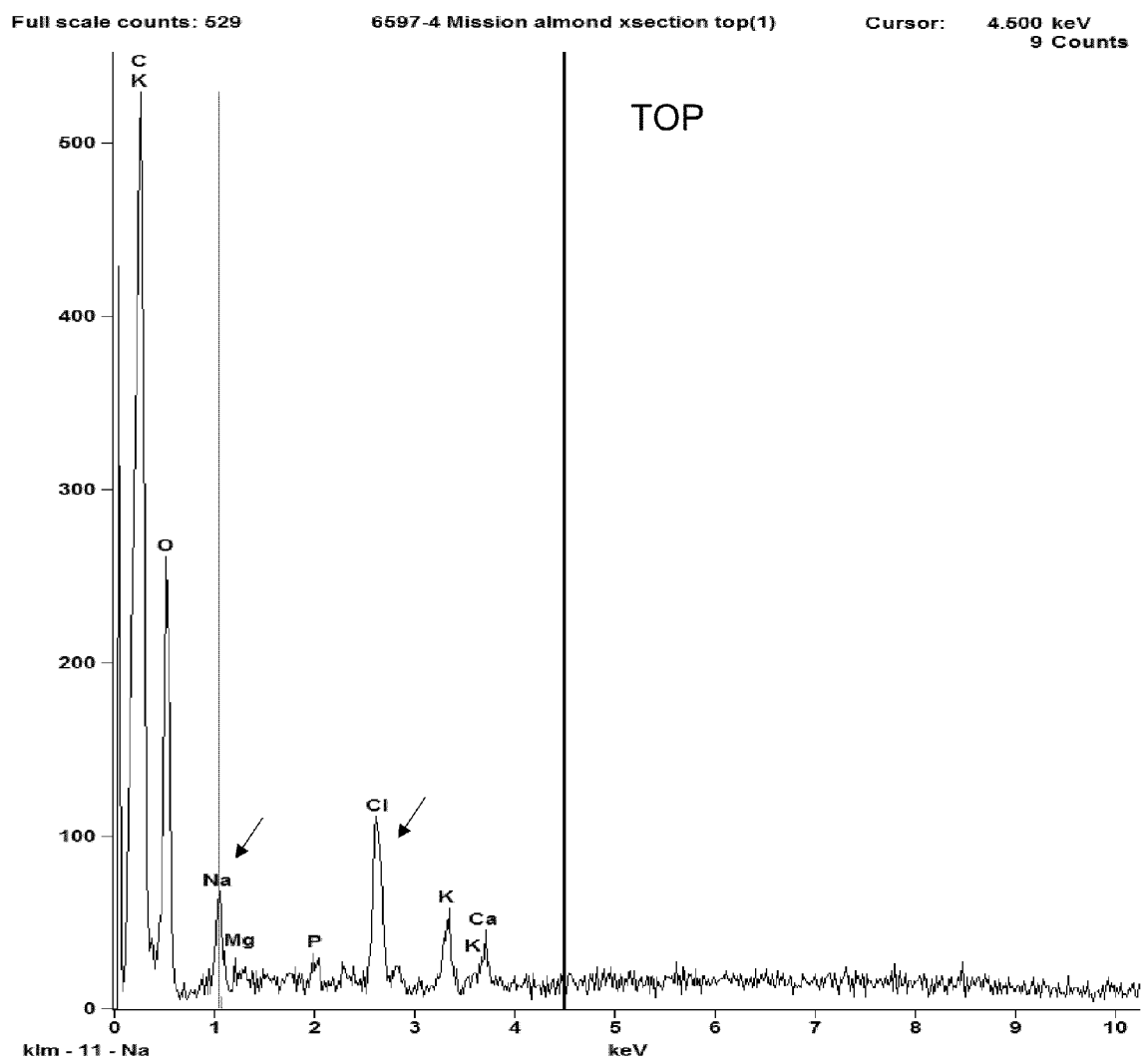
Figure 30C:
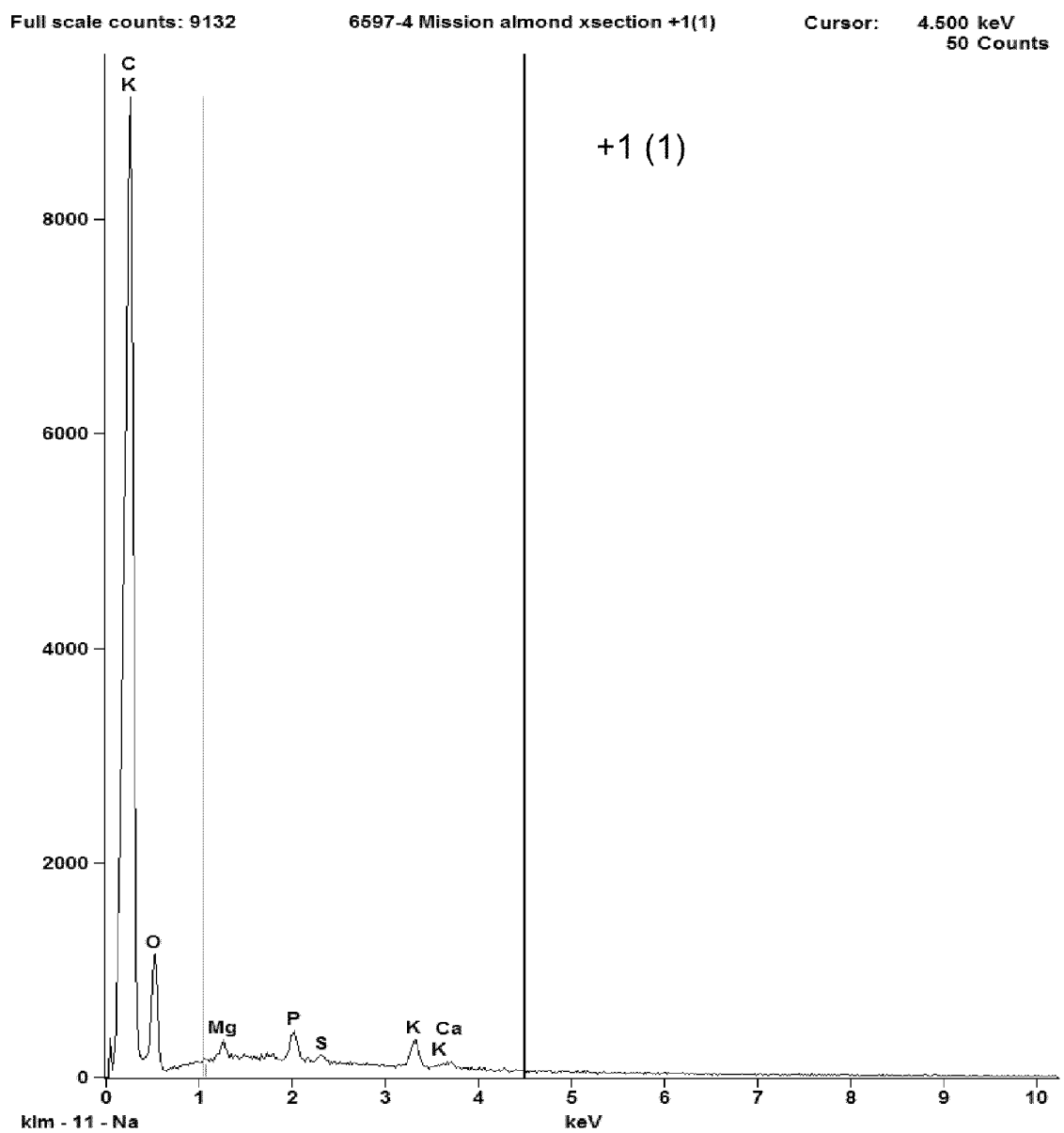
Figure 30D:
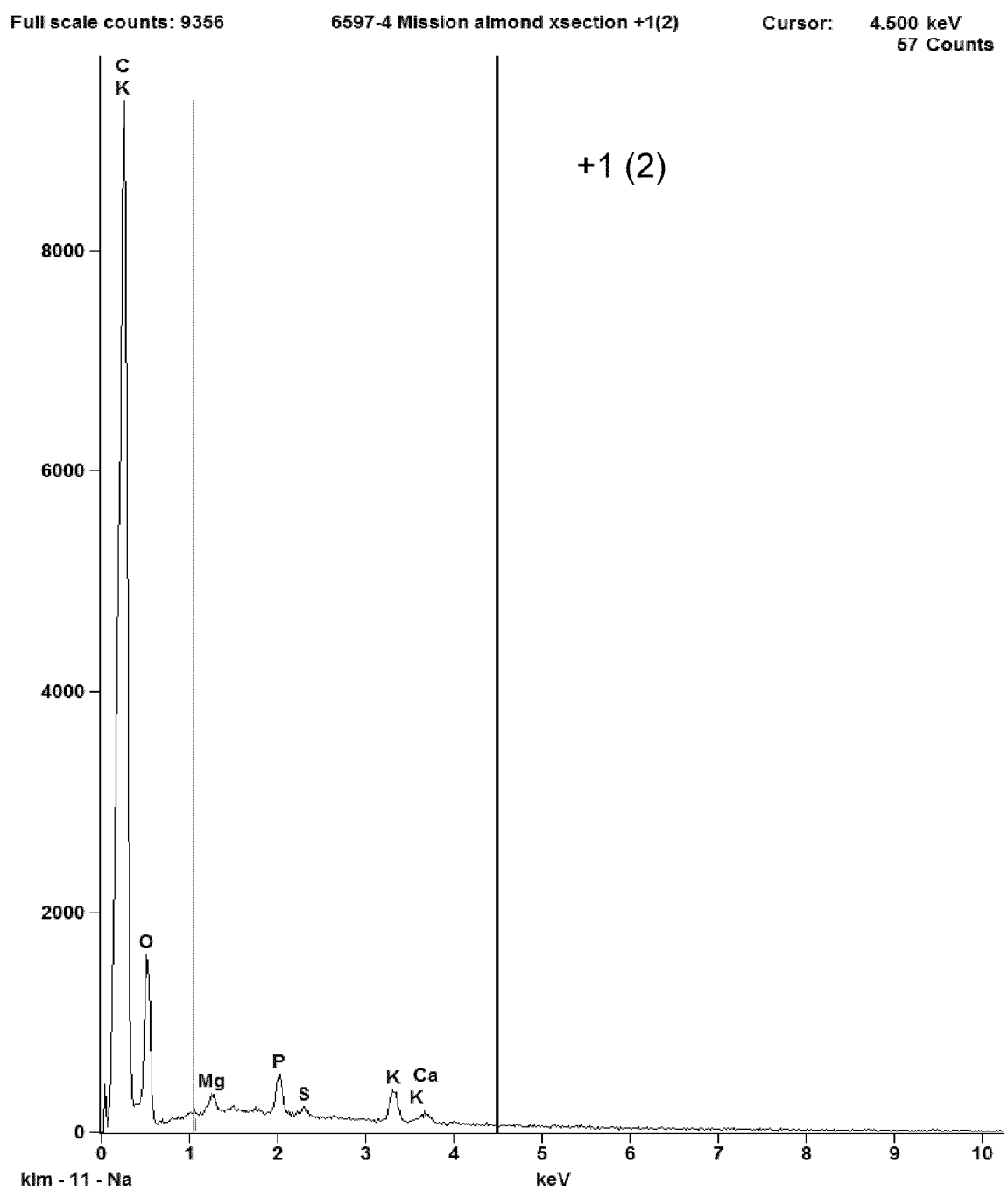
Figure 30E:
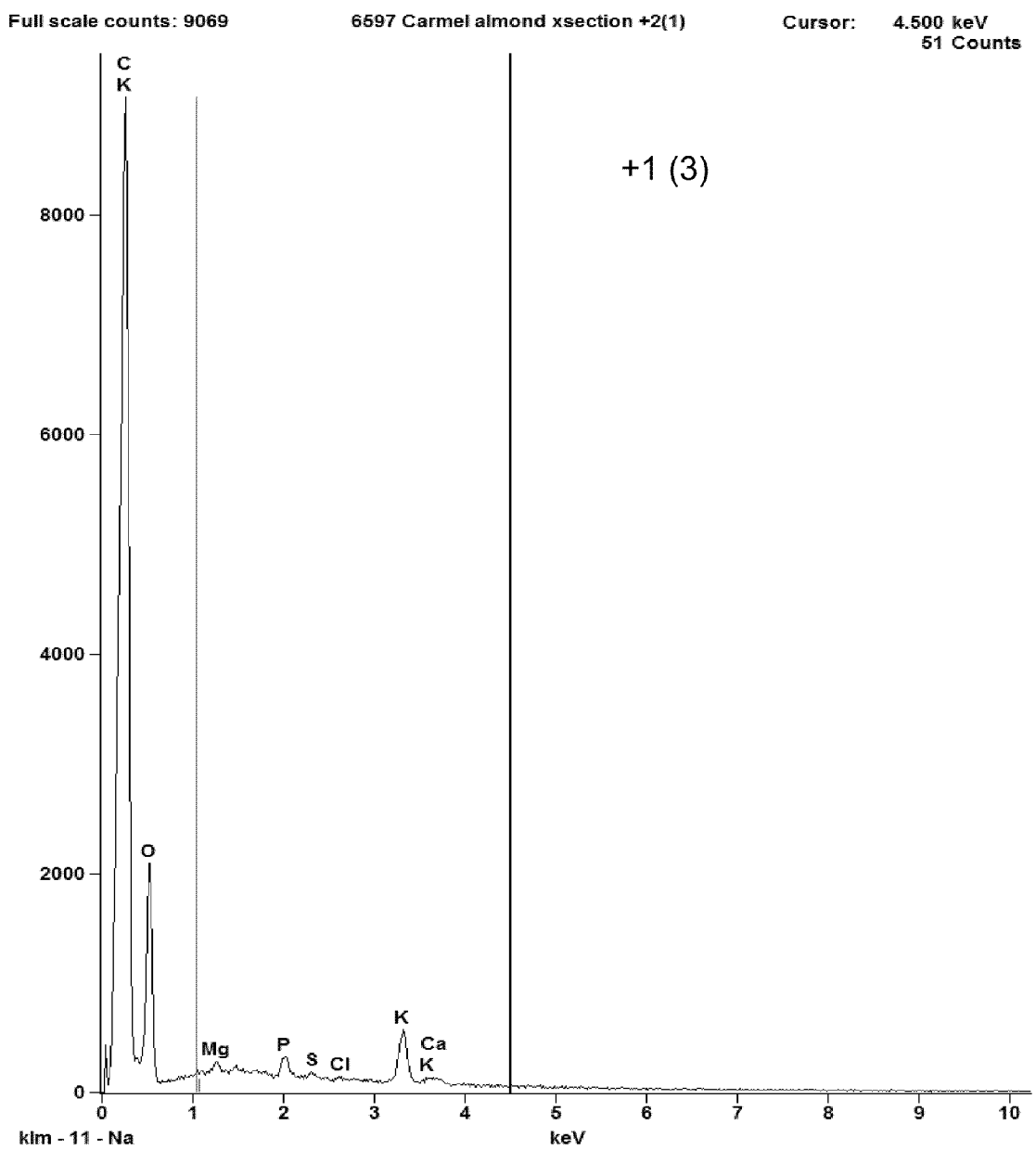
Figure 30F:
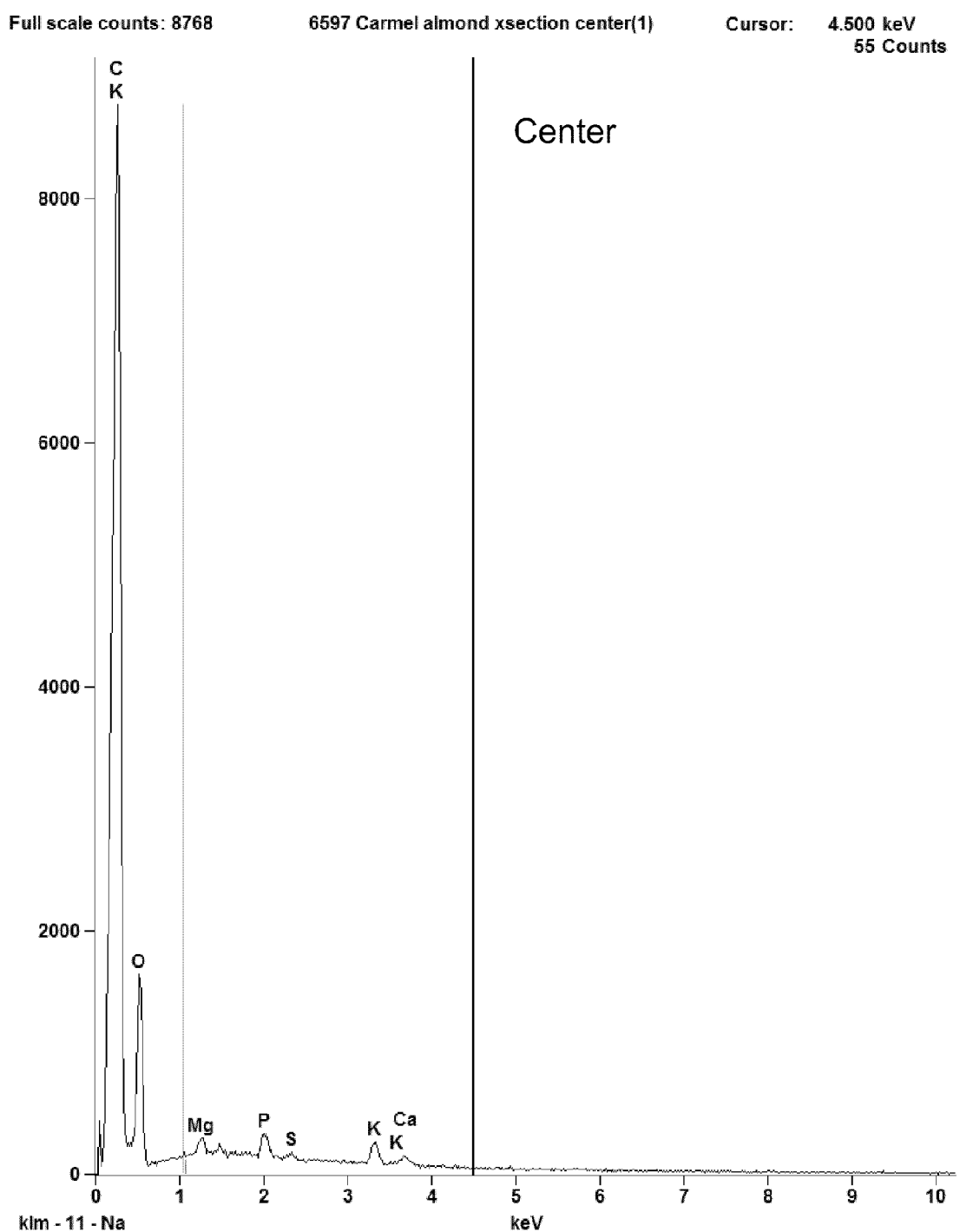

FIGS. 29a-29f show stereo microscopy and x-ray analysis of the salt infused Carmel almonds. An image of a cross-section of the almond is shown in FIG. 29a identifying x-ray detection positions as top, 1, 2, 3, and center. The 1 position was just under the surface and each position is about 1 mm apart. An x-ray spectrum is shown for each point in FIGS. 29b-29f. Position top, 1, 2, and 3 all positively tested for sodium chloride as evidenced with the arrows in the spectrums identifying the sodium and chloride signals. Thus, the salt had infused at least about 3 to about 4 mm internally into the nut. FIGS. 30a-30f show a similar stereo microscopy and x-ray analysis for salt infused Mission almonds. While infusion was less, it is at the top surface and possibly about 1 mm or less internally into the nut.

While the methods and products have been particularly described with specific reference to particular process and product embodiments, it will be appreciated that various alterations, modifications and adaptations may be based on the present disclosure, and are intended to be within the spirit and scope of the present disclosure as defined by the following claims.

What we claim is:

1. A process of producing flavored salt infused roasted seeds, the process comprising:
conditioning raw seeds at a temperature of about 100° F. or less;
tumbling the conditioned raw seeds in a rotating apparatus;
applying brine to the tumbling conditioned raw seeds by introducing the brine into the rotating apparatus at a continuous application rate of about 5 to about 10 grams brine/minute/kilogram raw seeds continuously throughout a tumbling time period of about 3 to about 10 minutes;
the brine comprising:
about 5 to about 20 weight percent sodium chloride; and
a temperature of 70° F. to about 200° F.;
infusing the conditioned raw seeds with the brine comprising:
a temperature differential of about 80° F. or less, between the temperature of the brine and a temperature of the conditioned raw seeds;
wherein the infusing is without immersing the conditioned raw seeds in a pool of the brine;
producing salt infused raw seeds without a visibly detectable surface coating of sodium chloride thereon prior to roasting;
immediately roasting the salt infused raw seeds after application of the brine to produce salt infused roasted seeds, within about 5 minutes or less after infusing.

2. The process of claim 1, further comprising, after all roasting is complete and separate from the roasting step, applying about 0.1 to about 10 weight percent oil solution to the salt infused roasted seeds where the oil solution has 0 to about 5 weight percent flavors blended therein, the oil applied at an application rate so that at least a portion of the oil and flavors are infused internally into the seeds.

3. The process of claim 2, further comprising depositing about 0.5 to about 6 weight percent powdered seasoning to the salt infused roasted seeds as the oil solution is being applied so that the powdered seasonings remain on an external surface of the seeds to produce flavored salt infused roasted seeds having both infused and externally deposited components.

4. The process of claim 3, wherein the oil solution has about 0.5 to about 3 weight percent flavors blended therein and wherein the flavors are selected from the group consisting of lemon, herbs, spices, ginger, chili, garlic, cilantro, lime, pepper, chocolate, coffee, maple, vanilla, caramel, brown sugar, fruits, onion, sugar, paprika, peppercorns, and mixtures thereof.

5. The process of claim 3, wherein depositing the powdered seasoning includes depositing salt so that the flavored roasted salt infused seeds have a two stage salt application with about 0.3 to about 1.8 weight percent salt infused therein obtained from the brine and about 0.3 to about 1.5 percent salt deposited on an external surface.

6. The process of claim 3, wherein depositing the powdered seasoning includes depositing both salt and a separate seasoning ingredient selected from the group consisting of lemon, herbs, spices, ginger, chili, garlic, cilantro, lime, pepper, chocolate, coffee, maple, vanilla, caramel, brown sugar, fruits, onion, sugar, paprika, peppercorns, and mixtures thereof so that the flavored roasted salt infused seeds have a two-stage salt application.

7. The process of claim 1, further comprising cooling the roasted salt infused seeds to about 120° F. or below prior to applying the oil solution.

8. The process of claim 1, wherein the application rate and temperature differential are effective so that the salt infused raw seeds absorb about 5 to about 15 percent water and about 0.3 to about 2 percent sodium chloride.

9. The process of claim 1, wherein a total amount of the brine applied to the tumbling conditioned raw seeds is about 6 to about 8 percent based on a weight of the raw seeds applied over a residence time of about 3 to about 4 minutes.

10. The process of claim 1, wherein the application rate of the brine is about 3 percent or less of the weight of the seeds per minute throughout the time period of about 3 to about 10 minutes.

11. The process of claim 1, wherein the conditioned raw seeds are conditioned whole, raw full-fat nut kernels.

12. The process of claim 1, wherein the raw seeds are nut kernels selected from the group consisting of peanuts, almonds, pistachios, cashews, hazelnuts, filberts, macadamia nuts, brazil nuts, pine nuts, pecans, walnuts, and mixtures thereof.

13. The process of claim 1, wherein the conditioning raw seeds includes dry blanching the raw seeds at a temperature of about 70° F. to about 100° F.

14. The process of claim 1, wherein the applying the brine includes applying the brine at an application rate of about 0.5% to about 1% of the brine solution per minute.

\* \* \* \* \*